US012808445B2

(12) United States Patent
Wu et al.

(10) Patent No.: US 12,808,445 B2
(45) Date of Patent: Nov. 24, 2026

(54) DECORATIVE MEMBER, HOUSING ASSEMBLY, AND ELECTRONIC DEVICE

(71) Applicant: Honor Device Co., Ltd., Shenzhen (CN)

(72) Inventors: Jiang Wu, Shenzhen (CN); Kangle Xue, Shenzhen (CN); Chuanguo Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 328 days.

(21) Appl. No.: 18/562,013

(22) PCT Filed: Jan. 3, 2023

(86) PCT No.: PCT/CN2023/070203

§ 371 (c)(1),
(2) Date: Nov. 17, 2023

(87) PCT Pub. No.: WO2023/160256

PCT Pub. Date: Aug. 31, 2023

(65) Prior Publication Data

US 2024/0229950 A1 Jul. 11, 2024

(30) Foreign Application Priority Data

Feb. 25, 2022 (CN) ......................... 202210181188.9

(51) Int. Cl.
*F16K 17/00* (2006.01)
*G06F 1/16* (2006.01)
(Continued)

(52) U.S. Cl.
CPC .......... *F16K 17/003* (2013.01); *G06F 1/1626* (2013.01); *G06F 1/1686* (2013.01);
(Continued)

(58) Field of Classification Search
CPC ........ F16K 17/003; F16K 24/00; F16K 17/00; G06F 1/1626; G06F 1/1686; H04M 1/0264; H04M 1/0283; H04M 1/18; H04M 1/026
See application file for complete search history.

(56) References Cited

U.S. PATENT DOCUMENTS 11,165,894 B2 11/2021 Li et al.
2021/0234948 A1* 7/2021 Li ....................... H04M 1/0249
(Continued)

FOREIGN PATENT DOCUMENTS

CN 107465776 A 12/2017
CN 110365820 A 10/2019
(Continued)

*Primary Examiner* — Zhitong Chen
(74) *Attorney, Agent, or Firm* — Slater Matsil, LLP

(57) ABSTRACT

This application provides a decorative member, a housing assembly, and an electronic device. In the decorative member, a plurality of balance holes and balance valves covering the balance holes are arranged on a support, including at least two first balance holes arranged at intervals on a main board portion of the support and first balance valves covering the first balance holes. In addition, a plurality of vent channels in communication with each other are formed in a region on the main board portion where a first adhesive layer is not arranged, and an end of each of the vent channels extends to an edge of the main board portion and is in communication with a first vent gap formed between a cover plate and a decorative ring.

20 Claims, 19 Drawing Sheets

1

(51) Int. Cl.
*H04M 1/02* (2006.01)
*H04M 1/18* (2006.01)

(52) U.S. Cl.
CPC ....... *H04M 1/0264* (2013.01); *H04M 1/0283* (2013.01); *H04M 1/18* (2013.01)

(56) References Cited

U.S. PATENT DOCUMENTS

| | | | | |
|---|---|---|---|---|
| 2021/0243907 | A1 | 8/2021 | Jung et al. | |
| 2022/0377163 | A1* | 11/2022 | Li ........................... | H04M 1/18 |

FOREIGN PATENT DOCUMENTS

| | | | |
|---|---|---|---|
| CN | 210899904 | U | 6/2020 |
| CN | 112106453 | A | 12/2020 |
| CN | 112533430 | A | 3/2021 |
| CN | 215500032 | U | 1/2022 |

* cited by examiner

DECORATIVE MEMBER, HOUSING ASSEMBLY, AND ELECTRONIC DEVICE

CROSS-REFERENCE TO RELATED APPLICATIONS

This application is a national stage of International Application No. PCT/CN2023/070203 filed on Jan. 3, 2023, which claims priority to Chinese Patent Application No. 202210181188.9 filed on Feb. 25, 2022. The disclosures of both of the aforementioned applications are hereby incorporated by reference in their entireties.

TECHNICAL FIELD

This application relates to the field of electronic product technologies, and in particular, to a decorative member, a housing assembly, and an electronic device.

BACKGROUND

To prevent an electronic device such as a mobile phone and a tablet computer from entering water, air tightness of the electronic device is constantly enhanced. When the housing of the electronic device is deformed by external force, the air pressure in the electronic device changes accordingly, which may drive the diaphragm of an audio device to polarize and produce noise.

To resolve the problem of noise generated by the audio device due to the change of air pressure in the electronic device, in the conventional technology, an air hole is usually provided on a decorative member of a camera of a back cover of electronic device, the inside and outside of the electronic device are brought into communication with each other through the air hole, and the air hole is covered with a waterproof breathable film. The waterproof breathable film can balance the air pressure inside and outside the electronic device and prevent the audio device from generating noise.

However, limited by the layout of the camera, the area of the waterproof breathable film cannot fully meet the requirement, and if the vent channel communicating the air hole with the outside is blocked, a venting failure may be caused.

SUMMARY

This application provides a decorative member, a housing assembly, and an electronic device. A camera module has an anti-shake function, and the decorative member adopts a plurality of balance valves and a plurality of paths for venting, which can satisfy the venting requirement of the electronic device and can effectively avoid a venting failure.

According to a first aspect, this application provides a decorative member, configured to be mounted to a housing of an electronic device, including a support, a cover plate, a first adhesive layer, and a balance valve.

The support includes a main board portion, a decorative ring, and a connecting portion. Two side surfaces of the main board portion are respectively a first surface and a second surface, the first surface faces outside of the housing, and the second surface faces inside of the housing. The decorative ring protrudes from a periphery of the first surface, the cover plate is arranged on the first surface, and a first vent gap is formed between the cover plate and the decorative ring. The connecting portion is connected to a periphery of the second surface and is configured to be connected to the housing. At least one accommodating hole is provided on the main board portion, and the first adhesive layer is bonded between the cover plate and the main board portion and is arranged around an outer circumference of the accommodating hole.

A balance hole is provided on the support, where the balance hole includes at least two first balance holes provided on the main board portion, and the balance valve includes first balance valves covering the first balance holes in a one-to-one correspondence. At least two vent channels in communication with each other are formed between the main board portion and the cover plate, the first adhesive layer is configured to avoid the vent channels, each of the vent channels is in communication with the first vent gap, and the first balance holes are in communication with the vent channels.

Through a plurality of balance holes and balance valves covering the balance holes arranged on the support, the decorative member provided in this application includes at least two first balance holes arranged at intervals on a main board portion of the support, and first balance valves covering the first balance holes. In addition, a plurality of vent channels in communication with each other are formed in a region on the main board portion where a first adhesive layer is not arranged, and an end of each of the vent channels extends to an edge of the main board portion and is in communication with a first vent gap formed between a cover plate and a decorative ring. In this way, the electronic device may vent a gas simultaneously through a plurality of first balance holes on the support, and the gas in the electronic device may be vented through the first vent gap via any vent channel. Through venting by using the plurality of balance valves and a plurality of vent paths, venting efficiency of the electronic device can be improved, and venting may still be performed through another balance valve and another vent path when one of the balance valves fails or some of the vent paths are blocked, thereby avoiding venting failure.

In a possible implementation, the main board portion includes a first region and a second region respectively located on two sides of a center line of the main board portion, and the first region and the second region are both provided with the first balance hole.

By arranging the first balance holes in the first region and the second region on the two sides of the center line of the main board portion of the support, the first balance holes on the main board portion are dispersed, so as to avoid the risk that the first balance valves are excessively concentrated and the vent paths of all the first balance valves are blocked, prevent the venting failure from being caused, and achieve quick venting.

In a possible implementation, the first adhesive layer includes at least two adhesive sheets isolated from each other, and outer edges of the adhesive sheets extend to an edge of the main board portion.

The vent channel includes at least two first vent channels, each of the first vent channels extends from a middle of the main board portion to an edge, and the first balance hole is located in a middle region of the first vent channel.

In a possible implementation, the first adhesive layer includes one adhesive sheet, an edge of the adhesive sheet includes a notch section, the notch section is located between the adjacent first balance holes, and a spacing is defined between the notch section and an edge of the main board portion.

The vent channel includes at least two second vent channels, each of the second vent channels is formed between the notch section and the decorative ring, and the second vent channel extends along a periphery of the main board portion and is in communication with the adjacent first balance hole.

In a possible implementation, the first adhesive layer includes at least two adhesive sheets isolated from each other, an edge of the adhesive sheet close to an edge of the main board portion includes a notch section, the notch section is located between the adjacent first balance holes, and a spacing is defined between the notch section and the edge of the main board portion.

The vent channel includes at least one first vent channel and at least one second vent channel, the first vent channel extends from a middle of the main board portion to the edge, and the second vent channel extends along a periphery of the main board portion and is in communication with the adjacent first balance hole.

In a possible implementation, the decorative ring is provided with at least one stepped groove, and the stepped groove is arranged corresponding to an end of the first vent channel.

The stepped groove extends from an inner wall surface to an outer wall surface of the decorative ring, and the stepped groove is in communication with a top end surface of the decorative ring.

The stepped groove corresponding to the first vent channel is arranged on the decorative ring, and the stepped groove extends from the inner wall surface of the decorative ring to the outer wall surface and is in communication with the top end surface of the decorative ring. In this way, a width of the part of the first vent gap corresponding to the end of the first vent channel is increased through the stepped groove, a vent area of the first vent gap is increased, and the venting efficiency of the electronic device is improved.

In a possible implementation, the connecting portion includes a side wall and a lapping rim, the side wall is connected to the periphery of the second surface and extends toward the housing, the lapping rim is connected to an end of the side wall facing away from the main board portion, and the lapping rim is connected to the housing.

Through arrangement of the side wall, the space volume of the decorative member is increased, so that the main board portion can protrude from the outer surface of the housing, and the space between the main board portion and the housing provides an additional accommodating space, which provides a sufficient mounting space for the camera module.

In a possible implementation, the side wall is provided with at least one air guide groove, a notch of the air guide groove is located on the first surface and is in communication with the vent channel, the air guide groove extends toward a side where the lapping rim is located, and the air guide groove is in communication with the outside.

The air guide groove is provided on the side wall, the notch of the air guide groove is located on the first surface of the main board portion of the support and in communication with the vent channel, and the air guide groove extends along the side where the lapping rim is located and is in communication with the outside. In this way, the air in the electronic device may be vented to outside not only through the first vent gap, but also through the vent channel via the air guide groove, which increases the vent path of the electronic device and reduces the risk of venting failure.

In a possible implementation, the side wall is further provided with a first vent hole, and the first vent hole is exposed outside the housing and extends from an outer wall surface of the side wall to be in communication with the air guide groove.

The first vent hole in communication with the air guide groove is provided on the side wall, so that the gas in the electronic device flows to the air guide groove through the vent channel, enters the first vent hole through the air guide groove, and can directly flow to the outside through the first vent hole.

In a possible implementation, the lapping rim is attached to a side surface of the housing facing inside of the electronic device, and the side wall extends out of the electronic device through a mounting hole provided on the housing.

A second vent gap is formed between the side wall and a hole wall of the mounting hole, and the air guide groove is in communication with the second vent gap.

By connecting the lapping rim of the support of the decorative member to the inner surface of the housing, the side wall of the support protrudes outward from the mounting hole of the housing, which can improve the appearance effect of the electronic device, and the connection stability of the support may further be enhanced through the stop limit of the housing. Moreover, the second vent gap is formed between the side wall of the support and the hole wall of the mounting hole, and the air guide groove provided on the side wall is brought into communication with the second vent gap, so that the air in the electronic device may be vented to outside not only through the first vent gap, but also through the second vent gap and the vent channel via the air guide groove, which increases the vent path of the electronic device and reduces the risk of venting failure.

In a possible implementation, the side wall is further provided with a communication groove, the communication groove is arranged corresponding to the hole wall of the mounting hole, and two ends of the communication groove are respectively in communication with the air guide groove and the second vent gap.

The air guide groove on the side wall extends into the housing, a communication groove corresponding to the hole wall of the mounting hole is provided on the side wall, and the notch of the communication groove extends from the outer wall surface of the side wall to be in communication with the air guide groove, so as to communicate the air guide groove with the second vent gap through the air guide groove.

In a possible implementation, a groove top wall of the communication groove close to the first surface is higher than a plane where an outer surface of the housing is located.

A top wall of the communication groove is arranged to be higher than the plane where the outer surface of the housing is located, and a top region of the communication groove is exposed outside the housing, which is equivalent to increasing the width of the second vent gap of a part where the communication groove is located, increasing the vent area of the second vent gap, and improving the venting efficiency of the electronic device.

In a possible implementation, the lapping rim has at least one widened portion, the widened portion extends toward outside of the support, at least one air guide channel is formed between the widened portion and an inner surface of the housing, and the air guide channel extends to the side wall and is in communication with the vent channel.

The balance hole further includes at least one second balance hole provided on the widened portion, the second balance hole is located in the air guide channel, and the balance valve further includes a second balance valve covering the second balance hole.

The widened portion is added on the lapping rim of the support, an air guide channel in communication with the vent channel is formed between the widened portion and the inner surface of the housing, and the second balance hole located within a coverage region of the air guide channel is provided on the widened portion. The second balance hole is covered with the second balance valve, so that the quantity of balance valves and the quantity of vent paths are increased, which can avoid venting failure and improve venting efficiency.

In a possible implementation, at least two widened portions are arranged, the widened portions are arranged at intervals in a circumferential direction of the lapping rim, and each of the widened portions is provided with at least one second balance hole.

More than two widened portions are arranged at intervals in the circumferential direction on the lapping rim, and each of the widened portions is provided with a second balance hole. The second balance valve covering each second balance hole may vent air to outside, so that the electronic device can vent air to outside through a plurality of balance valves and a plurality of vent paths, thereby avoiding venting failure. In addition, the vent area of the electronic device is increased, and the venting efficiency of the electronic device is improved.

In a possible implementation, the widened portion is an annular portion, and the widened portion is provided with at least two second balance holes arranged at intervals in a circumferential direction.

The widened portion is arranged to have an annular structure, at least two second balance holes may be arranged at intervals in the circumferential direction on the annular widened portion, and an increased quantity of second balance valves leads to an increased quantity of vent parts, an increased vent area, and higher venting efficiency. The electronic device vents air to outside through the plurality of balance valves and the plurality of vent paths, which can avoid the venting failure.

In a possible implementation, the second balance hole includes at least one second balance hole arranged corresponding to the air guide groove in a circumferential direction of the support.

The second balance hole is arranged corresponding to the air guide groove on the side wall of the support, the air guide channel in communication with the second balance hole is directly in communication with the air guide groove correspondingly, and the gas in the electronic device directly enters the air guide groove through the air guide channel after passing through the second balance valve, and then enters the vent channel.

In a possible implementation, the second balance hole includes at least one second balance hole staggered from the air guide groove in a circumferential direction of the support.

The second balance hole is arranged to be staggered from the air guide groove on the side wall of the support, the gas in the electronic device passes through the second balance valve and flows in the annular air guide channel on the periphery of the side wall of the support until the gas flows to correspond to the air guide groove on the side wall, and then enters the vent channel through the air guide groove.

In a possible implementation, the side wall includes an inner extension, the inner extension protrudes from an inner wall surface of the side wall toward a center of the support, and the air guide groove is provided on the inner extension.

The inner extension is added to the side wall, the inner extension protrudes inward from the inner wall surface of the side wall, which increases a thickness of the side wall and does not affect the shape and size of an outer wall surface of the side wall. To satisfy the arrangement requirement of the air guide groove, the air guide groove may be provided on the inner extension.

In a possible implementation, the side wall is provided with a plurality of air guide grooves, and the plurality of air guide grooves are arranged at intervals in a circumferential direction of the side wall.

A plurality of air guide grooves are arranged at intervals on the side wall in the circumferential direction, all the air guide grooves are in communication with the vent channel, and the air in the electronic device may be vented to outside through any air guide groove, so that the vent path is increased, and the risk of venting failure caused by blockage of one or some of the vent paths is reduced while ensuring the venting amount.

In a possible implementation, the cover plate is provided with at least one second vent hole, the second vent hole is in communication with the vent channel, and the second vent hole is covered with a decorative mesh.

The second vent hole is provided on the cover plate, so that the second vent hole is in communication with the vent channel, and the gas in the electronic device may be vented through the second vent hole. The decorative mesh is covered at the second vent hole, which can play the role of ventilation and prevent foreign objects from entering, and can achieve the aesthetic effect.

In a possible implementation, an orthographic projection of the second vent hole on the main board portion is located in a coverage region of the first balance hole.

The projection of the second vent hole on the main board portion is located in the coverage region of the first balance hole, the second vent hole exactly faces the first balance valve, and the vent path between the second vent hole and the first balance valve is short, so that the venting efficiency is high.

In a possible implementation, the decorative mesh includes an embedded portion and an outer ring portion arranged around an outer circumference of the embedded portion.

The embedded portion protrudes from a side of the outer ring portion facing the cover plate, the embedded portion is embedded in the second vent hole, and the outer ring portion is attached to a side surface of the cover plate facing the main board portion.

The decorative mesh is attached to the inner surface of the cover plate through the outer ring portion, which can ensure the firm connection of the decorative mesh and does not affect the flatness of the outer surface of the cover plate. The embedded portion is embedded in the second vent hole to play the role of ventilation and dust prevention, and can have a decorative effect.

In a possible implementation, a top end surface of the embedded portion facing away from the outer ring portion is flush with a surface of the cover plate.

In a possible implementation, the balance hole includes at least one main balance hole, and the main balance hole is located in an easy-to-press region on the support.

The main balance hole is arranged in the easy-to-press region on the support, and the main balance hole is correspondingly covered with the main balance valve. The easy-to-press region is a high-frequency pressing region, the region in the electronic device is prone to an air pressure increase, and the pressure inside the electronic device can be quickly vented through the main balance valve in the region.

In a possible implementation, an area of the main balance hole is greater than an area of another balance hole.

Compared with other balance holes, by increasing the area of the main balance hole, the area of the main balance valve covering the main balance hole is larger, and the venting efficiency of the main balance valve is higher, which is helpful to quickly vent the pressure in the electronic device.

In a possible implementation, the balance valve covers a side surface of the support facing the inside of the electronic device, or the balance valve covers a side surface of the support facing outside of the electronic device.

In a possible implementation, the balance valve includes a waterproof breathable film or a dust filter.

According to a second aspect, this application provides a housing assembly, mounted to an electronic device, and including a housing and the above decorative member.

The decorative member is located on a side of the housing facing outside of the electronic device, the housing is provided with a mounting hole, and the decorative member covers the mounting hole and is connected to a part of the housing located around an outer circumference of the mounting hole.

The housing assembly provided in this application includes a housing and a decorative member mounted to the housing. Through a plurality of balance holes and balance valves covering the balance holes arranged on the support, the decorative member includes at least two first balance holes arranged at intervals on a main board portion of the support, and first balance valves covering the first balance holes. In addition, a plurality of vent channels in communication with each other are formed in a region on the main board portion where a first adhesive layer is not arranged, and an end of each of the vent channels extends to an edge of the main board portion and is in communication with a first vent gap formed between a cover plate and a decorative ring. In this way, the electronic device may vent a gas simultaneously through the plurality of first balance holes on the support, and the gas in the electronic device may be vented through the first vent gap via any vent channel. Through venting by using the plurality of balance valves and a plurality of vent paths, venting efficiency of the electronic device can be improved, and venting may still be performed through another balance valve and another vent path when one of the balance valves fails or some of the vent paths are blocked, thereby avoiding venting failure.

In a possible implementation, the housing assembly further includes a second adhesive layer, where the second adhesive layer is bonded between the connecting portion of the decorative member and the housing.

In a possible implementation, the lapping rim of the connecting portion is attached to a side surface of the housing facing inside of the electronic device, and a side wall of the connecting portion extends out of the electronic device through the mounting hole.

The second adhesive layer is bonded between the lapping rim and the housing, and the second adhesive layer is arranged close to an outer edge of the lapping rim.

According to a third aspect, this application provides an electronic device, including a screen, a middle frame, an audio device, and a housing assembly as described above.

The middle frame includes a frame body and a support plate, the frame body is arranged on a peripheral side of the support plate, and the screen and the housing assembly are respectively connected to two sides of the middle frame.

An accommodating space is defined between the support plate and the housing of the housing assembly, and the audio device is mounted in the accommodating space. The support plate is provided with a sound outlet, and a sound outlet surface of the audio device is exposed in the sound outlet.

The electronic device provided in this application includes a housing assembly. The housing assembly includes a housing and a decorative member mounted to the housing. Through a plurality of balance holes and balance valves covering the balance holes arranged on the support, the decorative member includes at least two first balance holes arranged at intervals on a main board portion of the support, and first balance valves covering the first balance holes. In addition, a plurality of vent channels in communication with each other are formed in a region on the main board portion where a first adhesive layer is not arranged, and an end of each of the vent channels extends to an edge of the main board portion and is in communication with a first vent gap formed between a cover plate and a decorative ring. In this way, the electronic device may vent a gas simultaneously through the plurality of first balance holes on the support, and the gas in the electronic device may be vented through the first vent gap via any vent channel. Through venting by using the plurality of balance valves and a plurality of vent paths, venting efficiency of the electronic device can be improved, and venting may still be performed through another balance valve and another vent path when one of the balance valves fails or some of the vent paths are blocked, thereby avoiding venting failure.

In a possible implementation, the electronic device further includes a camera module, where the camera module is mounted in the accommodating space.

The camera module includes at least one camera, and a light-incident end of the camera is exposed in an accommodating hole of the decorative member of the housing assembly.

The camera module in the electronic device is mounted in the accommodating space defined by the support plate of the middle frame and the decorative member. The accommodating hole is provided on the decorative member, so that components such as the camera, a flash, and a sensor in the camera module are arranged in a one-to-one correspondence with the accommodating holes. The camera is used as an example. The light-incident end of the camera is exposed in the accommodating hole, so that the camera can collect external ambient light.

DESCRIPTIONS OF REFERENCE NUMERALS

1—electronic device;

10—housing assembly; 20—screen; 30—middle frame; 40—screen adhesive layer; 50—audio device; 60—sealing portion;

100—decorative member; 200—housing; 301—frame body; 302—support plate;

110—support; 120—cover plate; 130—first adhesive layer; 140—balance hole; 150—balance valve; 160—vent channel; 170—air guide channel; 180—second adhesive layer; 210—mounting hole;

111—main board portion; 112—decorative ring; 113—side wall; 114—lapping rim; 121—second vent hole; 122—decorative mesh; 131—adhesive sheet; 141—first balance hole; 142—second balance hole; 151—first balance valve; 152—second balance valve; 161—first vent channel; 162—second vent channel;

1111—accommodating hole; 1121—stepped groove; 1131—air guide groove; 1132—communication groove; 1133—inner extension; 1134—first vent hole; 1141—widened portion; 1221—embedded portion; 1222—outer ring portion; 1311—notch section; 3021—sound outlet; 3022—limiting wall;

**160*a*—first channel; 160*b*—second channel; 160*c*—third channel; 160*d***—fourth channel; a-first vent gap; b-second vent gap; and c-sound outlet gap.

DETAILED DESCRIPTION OF THE EMBODIMENTS

Terms used in implementations of this application are merely intended to explain specific embodiments of this application, and are not intended to limit this application.

With the development of communication technology, the design of a mobile terminal such as a mobile phone and a tablet computer tends to be thinner and thinner, so that the mobile terminal can have a better holding effect and more beautiful appearance. In addition, to improve the shooting performance of the mobile terminal, the function of a camera module equipped on the mobile terminal becomes increasingly more powerful, and the volume of the powerful camera module is often larger. To accommodate the larger camera module in the thin and light mobile terminal, housings of increasingly more mobile terminals are designed with decorative members. The decorative member protrudes from an outer surface of the housing, which may provide more mounting space for the camera module. In addition, the decorative member can facilitate the centralized layout of camera modules having a plurality of cameras, and can also improve aesthetics of the mobile terminal.

Figure 1:
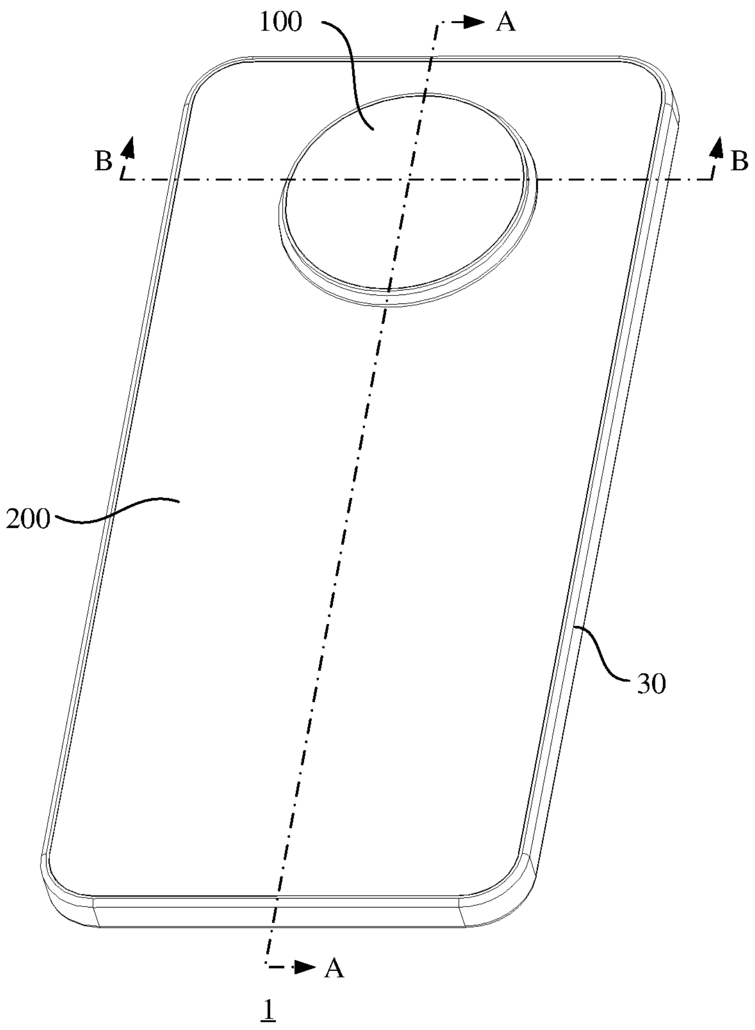
FIG. 1 is a schematic structural diagram of an electronic device according to an embodiment of this application.

FIG. 1 is a schematic structural diagram of an electronic device according to an embodiment of this application. Referring to FIG. 1, an electronic device 1 of this embodiment is described by using the mobile phone as an example. It should be understood that the electronic device 1 of this embodiment may further be a mobile terminal device such as a tablet computer, a notebook computer, an ultra-mobile personal computer (ultra-mobile personal computer, UMPC), a netbook, a personal digital assistant (Personal Digital Assistant, PDA), a smart wearable device, a point of sales (Point of Sales, POS), or an augmented reality (augmented reality, AR)/virtual reality (virtual reality, VR) device.

FIG. 1 shows a structure of a side of a housing assembly 10 of the electronic device 1 from a rear view direction of the electronic device 1. The housing assembly 10 includes a housing 200 and a decorative member 100 mounted to the housing 200. The housing 200 is equivalent to a back cover of the electronic device 1, and the decorative member 100 is located on an outer surface of the housing 200 and may protrude outward from the outer surface of the housing 200. A camera module (not shown in the figure) may be arranged in a coverage region of the decorative member 100, and a side of the decorative member 100 facing away from the housing 200 (a side facing outside of the electronic device 1) can transmit light, so that the camera module can be irradiated with external light through the decorative member 100.

The outer surface of the housing 200 is a side surface of the housing 200 facing the outside of the electronic device 1, another side surface of the housing 200 opposite to the outer surface is an inner surface, and the inner surface of the housing 200 faces the inside of the electronic device 1.

The electronic device 1 further includes a screen (not shown in the figure) and a middle frame 30. The screen is located at another side opposite to the housing assembly 10, the middle frame 30 is arranged on peripheral sides of the housing assembly 10 and the screen, the screen and the housing assembly 10 are respectively connected to two sides of the middle frame 30, and the screen and the housing assembly 10 are supported and fixed through the middle frame 30. The screen, the middle frame 30, and the housing assembly 10 jointly define an accommodating space of the electronic device 1, and the accommodating space is configured to accommodate devices such as a camera module, a main board (not shown), a battery (not shown), and an audio device (not shown).

Figure 2:
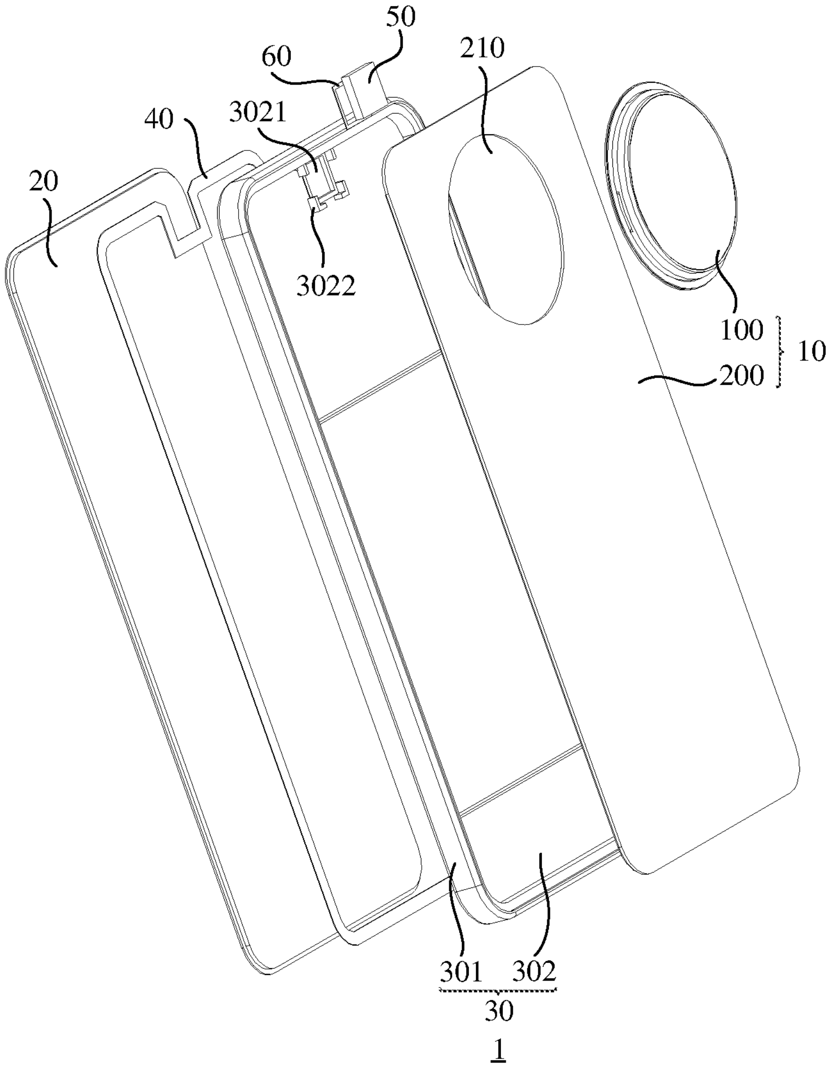
FIG. 2 is an exploded view of the electronic device in FIG. 1.

FIG. 2 is an exploded view of the electronic device in FIG. 1. Referring to FIG. 2, in this embodiment, a side of the middle frame 30 facing the screen 20 is defined as a front side of the middle frame 30, and the side of the middle frame 30 facing the housing 200 is defined as a rear side of the middle frame 30. In practical application, the middle frame 30 usually includes a frame body 301 and a support plate 302. The frame body 301 is arranged on peripheral sides of the housing assembly 10 and the screen 20, and the support plate 302 is located in a defined region of the frame body 301 and connected to an inner side wall (a wall surface located on a side of an inner periphery of the frame body 301) of the frame body 301. Exemplarily, the support plate 302 may be integrally formed with the frame body 301.

The screen 20 is connected to the front side of the middle frame 30, and the screen 20 may be attached to a surface of the support plate 302. The support plate 302 supports the screen 20, which can ensure the stable connection between the screen 20 and the middle frame 30 and prevent the screen 20 from collapsing. Exemplarily, the screen 20 is bonded to the support plate 302 through a screen adhesive layer 40, and the screen adhesive layer 40 may be an annular frame adhesive as shown in the figure, or the screen adhesive layer 40 may cover the support plate 302 in a large area to improve the connection strength of the screen 20.

The housing 200 is connected to the rear side of the middle frame 30, and a mounting hole 210 is provided in the housing 200. The decorative member 100 covers the mounting hole 210 and is connected to a region of the housing 200 located around an outer circumference of the mounting hole 210, and the decorative member 100 may protrude from the outer surface of the housing 200. An edge region of the inner surface of the housing 200 may be supported and fixed on the frame body 301. For example, the edge region of the inner surface of the housing 200 is bonded to the frame body 301 through frame adhesive (not shown). A gap is defined between the housing 200 and the support plate 302, the frame body 301, the support plate 302, and the housing 200 define an accommodating space of the electronic device 1, and devices such as a camera module (not shown), a main board (not shown), a battery (not shown), and an audio device 50 may be mounted in a space between the support plate 302 and the housing 200.

Referring to FIG. 2, the support plate 302 is provided with a sound outlet 3021, and the audio device 50 is arranged corresponding to the sound outlet 3021. For example, a limiting wall 3022 may be arranged in a region around an outer circumference of the sound outlet 3021 on the support plate 302, and the audio device 50 is stuck in the region defined by the limiting wall 3022. In addition, a sealing portion 60 is arranged between the audio device 50 and the support plate 302. The sealing portion 60 may be arranged on a periphery of the audio device 50, for example, and the audio device 50 is hermetically connected to the support plate 302 through the sealing portion 60. The audio device 50 may be, for example, a receiver or a speaker, and a sound outlet surface of the audio device 50 is exposed in the sound outlet 3021. A side of the audio device 50 facing the screen 20 is a front cavity, and a side of the audio device facing the housing 200 is a rear cavity.

The camera module includes one or more cameras, and the camera module may be a single camera module, a double camera module, or a multi-camera module (including three or more cameras). In addition, the camera in the camera module includes, but is not limited to, at least one of an auto focus (Auto Focus, AF) camera, a fix focus (Fix Focus, FF) camera, a wide-angle camera, a telephoto camera, a color camera, or a black and white camera. In addition, the camera module may further include another device such as a flash and a sensor (such as a color temperature sensor).

The camera module is mounted in the coverage region of the decorative member 100, the orientation of each camera of the camera module may be arranged based on layout design requirements, and the structure of the decorative member 100 may be arranged based on the layout design of the camera module. An outline shape of the decorative member 100 shown in FIG. 2 is not limited to a circle by way of example. One or more cameras in the camera module may include cameras located in the center of the decorative member 100, or may include cameras arranged at intervals in a circumferential direction of the decorative member 100.

Figure 3:
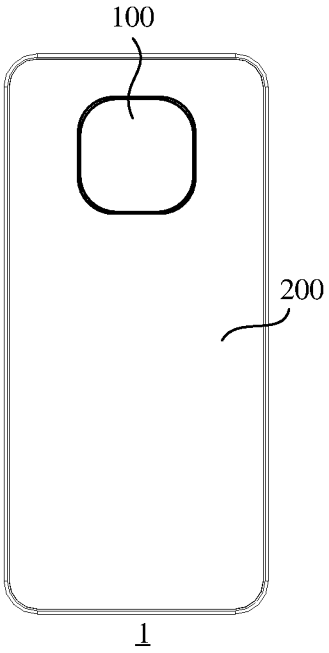
FIG. 3 is a rear view of another electronic device according to an embodiment of this application.
Figure 4:
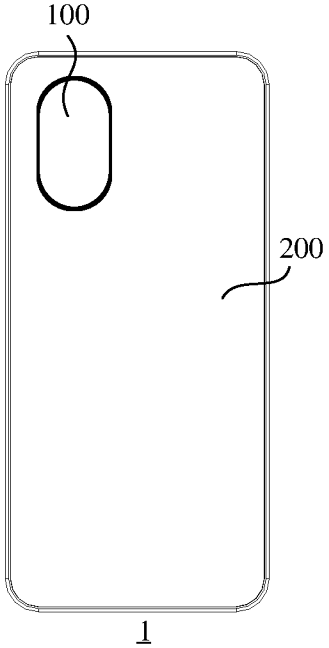
FIG. 4 is a rear view of a third electronic device according to an embodiment of this application.

In practical application, the outline shape of the decorative member 100 of the electronic device 1 is not limited to a circle, which may also be another shape such as a square or a rectangle, and the layout of the camera module may be designed based on the outline shape of the decorative member 100. FIG. 3 is a rear view of another electronic device according to an embodiment of this application. An outline shape of a decorative member 100 of the electronic device 1 shown in FIG. 3 is a square, and cameras in a camera module may be arranged in rows and columns at intervals in a width direction and a length direction of a housing 200. FIG. 4 is a rear view of a third electronic device according to an embodiment of this application. An outline shape of a decorative member 100 of the electronic device 1 shown in FIG. 4 is a rectangle, and cameras in a camera module may be mainly arranged in columns at intervals in a length direction of a housing 200. One, two, or more columns of cameras may be arranged based on an actual width of the decorative member 100.

In addition, referring to FIG. 1, FIG. 3, and FIG. 4, based on an internal layout structure and appearance structure design of the electronic device 1, the decorative member 100 may be located in a middle region in a width direction of the electronic device 1. For example, the decorative member 100 has a symmetrical structure with respect to a center line in the length direction of the electronic device 1. Alternatively, the decorative member 100 may be offset from the center of the electronic device 1 in the width direction, for example, the decorative member 100 may be arranged close to a side edge of the electronic device 1 in the width direction.

In practical application, to prevent water from entering the electronic device 1, air tightness of the electronic device 1 is constantly strengthened, and most of the existing electronic device 1 can reach the protection level of IPX7, where "X" represents the dust-proof level of the electronic device 1, and the number "7" represents the waterproof level of the electronic device 1, which means that the electronic device 1 can have a protection duration of not less than 30 min for internal parts during immersion into the water at least 1 m deep. For the electronic device 1 with high air tightness, when the housing 200 of the electronic device 1 is pressed, the air pressure in the electronic device 1 may change accordingly.

As shown in FIG. 1 and FIG. 2, since an accommodating space is defined between the middle frame 30 and the housing assembly 10, a specific gap is defined between the support plate 302 of the middle frame 30 and the housing 200. When the electronic device 1 is pressed, the air pressure in the space between the support plate 302 and the housing 200 mainly changes. Since the audio device 50 is mounted in the accommodating space formed between the middle frame 30 and the housing 200, when the housing 200 is pressed, the change of air pressure in the accommodating space may drive polarization of the diaphragm of the audio device 50 to produce noise.

Therefore, in the related art, an air hole is usually provided on the decorative member, and the air hole is in communication with the outside through a vent channel. The air hole is covered with a waterproof breathable film, and air can flow inside and outside the electronic device through the waterproof breathable film while the waterproof breathable film plays a waterproof role, so as to balance the air pressure inside and outside the electronic device, avoid the polarization of the diaphragm of the audio device, and prevent the electronic device from producing noise.

However, limited by the size of the decorative member, an area of a single air hole is relatively small, and the venting amount of the waterproof breathable film covering the air hole cannot fully satisfy the venting requirement of the electronic device. In addition, if the waterproof breathable film or the vent channel is blocked by foreign matters such as dust, a displacement vent path communicating the accommodating space of the electronic device with the outside is blocked, which may lead to venting failure of the electronic device.

In view of this, in this embodiment, by designing the structure of the decorative member 100, the decorative member 100 performs venting through a plurality of balance valves and a plurality of vent paths, all the vent paths are in communication with each other, and each of the balance valves may perform venting through all the vent paths. The venting amount of the decorative member 100 can satisfy the venting requirement of the electronic device 1, and by adding the redundant venting design, when one of the balance valves fails or some of the vent paths are blocked, the venting may be performed through other balance valves and vent paths to avoid venting failure.

The specific structure of the decorative member 100 and the vent path formed between the decorative member 100 and the housing 200 are described in detail below.

Embodiment 1

Figure 5:
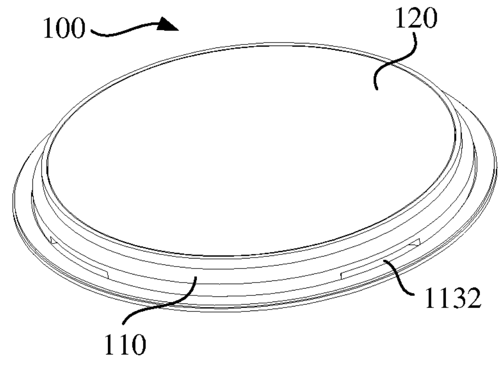
FIG. 5 is a schematic structural diagram of a decorative member according to an embodiment of this application.
Figure 6:
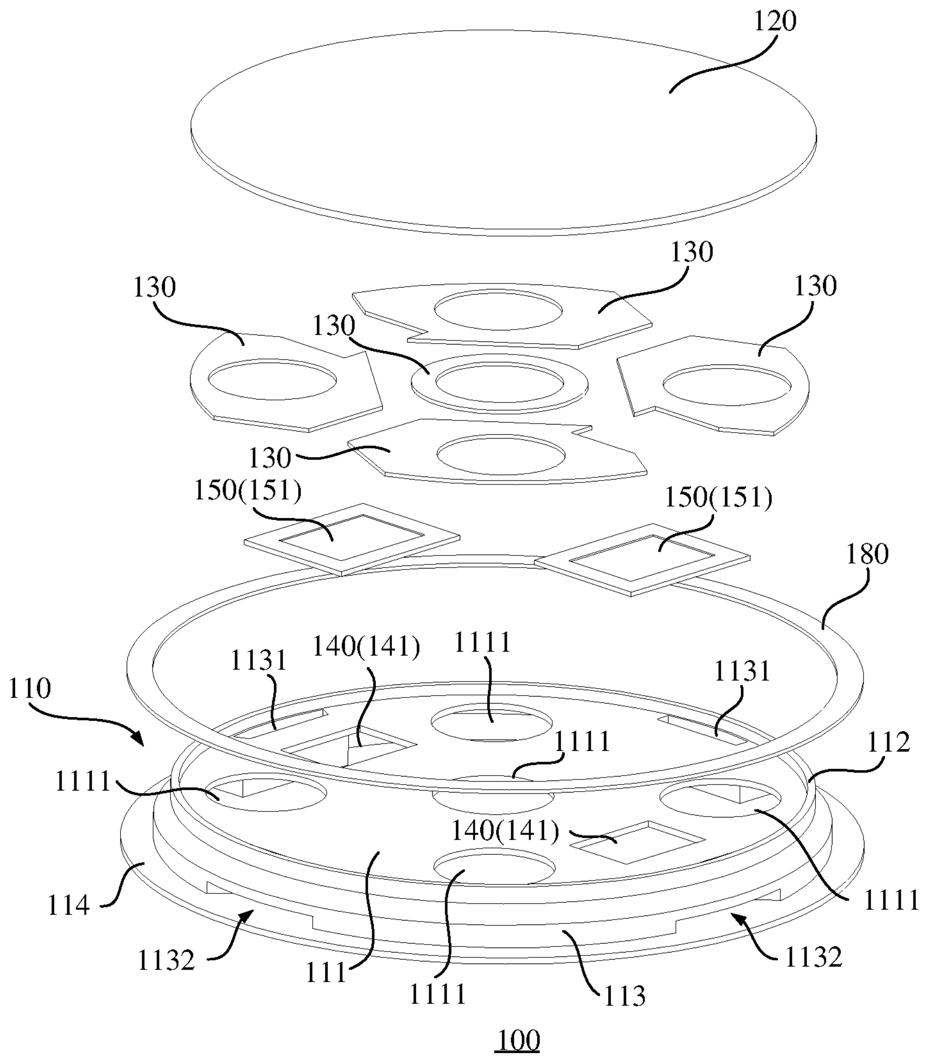
FIG. 6 is an exploded view of the decorative member in FIG. 5.
Figure 7:
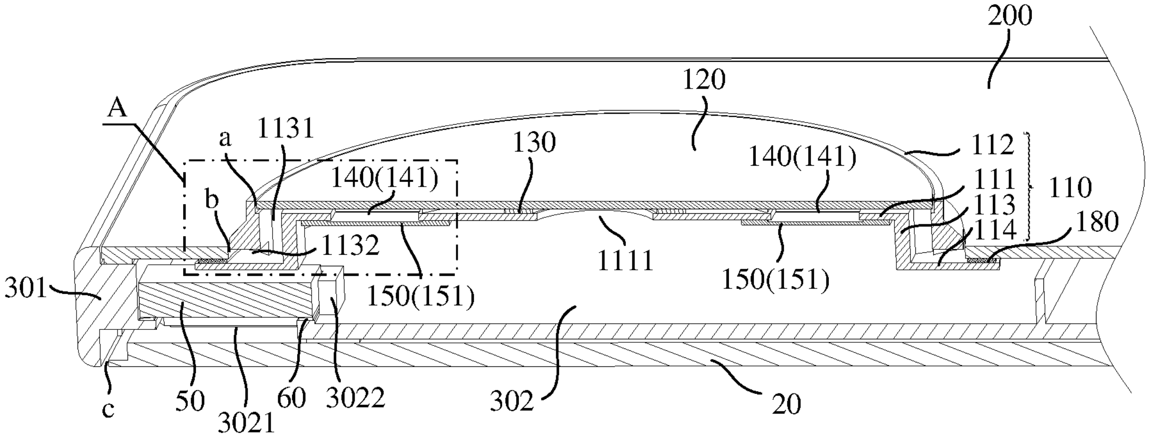
FIG. 7 is a schematic diagram of a partial cross section in FIG. 1 taken along A-A.

FIG. 5 is a schematic structural diagram of a decorative member according to an embodiment of this application; FIG. 6 is an exploded view of the decorative member in FIG. 5; and FIG. 7 is a schematic diagram of a partial cross section in FIG. 1 taken along A-A. It should be noted that FIG. 5 shows a decorative member 100 matching the electronic device 1 in FIG. 1, and the overall outline shape of the decorative member 100 is a circle. It may be understood that, as described above, as shown in FIG. 3 and FIG. 4, the overall outline shape of the decorative member 100 may be another shape such as a square or a rectangle, which is not specifically limited in this embodiment. The decorative member 100 having a circular outline is used as an example for description below.

Referring to FIG. 5 and FIG. 6, a main body structure of the decorative member 100 includes a support 110 and a cover plate 120. As shown in FIG. 7, the support 110 is connected to a housing 200. For example, the support 110 may be connected to a region around an outer circumference of a mounting hole 210 on the housing 200, and the decorative member 100 is mounted and fixed to the housing 200 through the support 110. The cover plate 120 is arranged on a side of the support 110 facing away from the housing 200, that is, the cover plate 120 faces the outside of the electronic device 1. The cover plate 120 may be a high-transparency glass cover plate 120 or a plastic cover plate 120, so that inside of the decorative member 100 may be irradiated with external light through the cover plate 120, and the camera module mounted between the decorative member 100 and a middle frame 30 can receive the external light.

In addition, as shown in FIG. 7, a sound outlet gap c is formed between a top end of a screen 20 and a front side of a frame body 301 of the middle frame 30, and a sound outlet 3021 on the support plate 302 of the middle frame 30 is in communication with the sound outlet gap c, so that sound produced by an audio device 50 is transmitted to the outside through the sound outlet gap c from the front cavity.

Figure 8A:
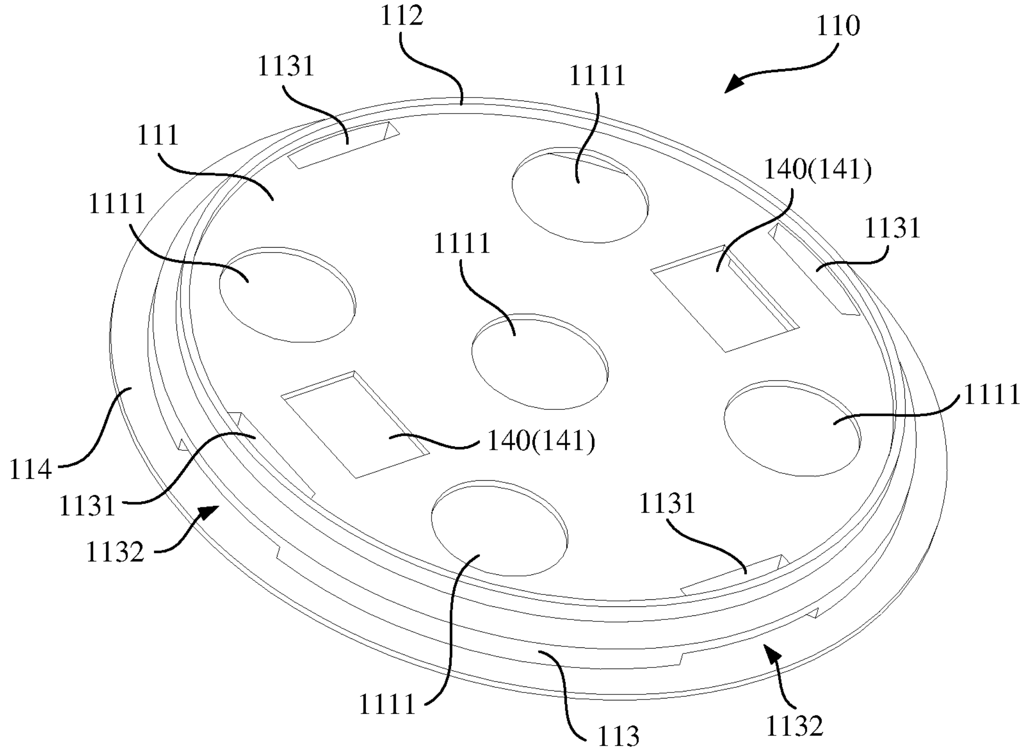
FIG. 8A is a front structural view of a support of the decorative member in FIG. 5.

FIG. 8A is a front structural view of a support of the decorative member in FIG. 5. Referring to FIG. 8, the support 110 of the decorative member 100 includes a main board portion 111, a decorative ring 112, and a connecting portion. Exemplarily, the main board portion 111, the decorative ring 112, and the connecting portion may be an integrally formed member, that is, the support 110 is an integrally formed structure.

The main board portion 111 is, for example, a plate-like structure matching the mounting hole 210 of the housing 200. The mounting hole 210 on the housing 200 being a circular mounting hole 210 is used as an example. The main board portion 111 may be a circular plate-like structure, and the decorative member 100 mainly covers the mounting hole 210 of the housing 200 through the main board portion 111. Two side surfaces of the main board portion 111 are respectively a first surface and a second surface. The first surface is a side surface of the main board portion 111 facing outside of the electronic device 1, and the second surface is a side surface of the main board portion 111 facing inside of the electronic device 1.

The decorative ring 112 protrudes from the first surface of the main board portion 111 and is arranged to surround the periphery of the main board portion 111. The cover plate 120 covering the first surface of the main board portion 111 may be located in a region surrounded by the decorative ring 112, and the cover plate 120 is limited through the decorative ring 112. Moreover, the decorative ring 112 is a main structure of the decorative member 100 exposed outside the electronic device 1 other than the cover plate 120. The cover plate 120 mainly plays the role of light transmission and protection, and the decorative ring 112 may play the role of decoration.

The connecting portion is connected to the periphery of the second surface of the main board portion 111. As shown in FIG. 7 and FIG. 8A, the connecting portion is configured to be connected to the region of the housing 200 located around an outer circumference of the mounting hole 210, so as to fixedly connect the support 110 to the housing 200. Specifically, the connecting portion may include a side wall 113 and a lapping rim 114. The side wall 113 is connected to the periphery of the second surface of the main board portion 111, and the side wall 113 extends away from the main board portion 111 (toward the housing 200). The lapping rim 114 is connected to an end of the side wall 113 facing away from the main board portion 111, and the lapping rim 114 may be attached to the housing 200. Through arrangement of the side wall 113, the space volume of the decorative member 100 is increased, so that the main board portion 111 can protrude from an outer surface of the housing 200, and the space between the main board portion 111 and the housing 200 provides an additional accommodating space, which provides a sufficient mounting space for the camera module.

In some embodiments, the support 110 may be connected to the outer surface of the housing 200, that is, the lapping rim 114 of the support 110 is connected to the region on the outer surface of the housing 200 located around the outer circumference of the mounting hole 210. In this case, the whole support 110 is exposed outside the housing 200. The lapping rim 114 of the support 110 may be an inward turnup structure, and the lapping rim 114 is formed by the side wall 113 extending inward (extending toward the center of the support 110). Alternatively, the lapping rim 114 of the support 110 may be an outward turnup structure, and the lapping rim 114 is formed by the side wall 113 extending outward (extending toward the peripheral side of the support 110).

Referring to FIG. 7, in some other embodiments, the support 110 may be connected to the inner surface of the housing 200, that is, the lapping rim 114 of the support 110 is connected to the region on the inner surface of the housing 200 located around the outer circumference of the mounting hole 210. In this case, the lapping rim 114 of the support 110 is located on an inner side of the housing 200, and the lapping rim 114 of the support 110 may be the foregoing outward turnup structure. The side wall 113 of the support 110 extends outward through the mounting hole 210 on the housing 200, so that the support 110 protrudes from the outer surface of the housing 200. In this way, it is convenient to locate the decorative member 100, and the lapping rim 114 of the support 110 is located inside the electronic device 1, which has no impact on the appearance of the electronic device 1. By limiting the lapping rim 114 of the support 110 through the inner surface of the housing 200, the connection strength of the decorative member 100 may further be improved. The lapping rim 114 of the support 110 being connected to the inner surface of the housing 200 is used as an example for description below.

Referring to FIG. 6 and FIG. 7, for the connection between the cover plate 120 and the main board portion 111 of the support 110, a first adhesive layer 130 is arranged between the cover plate 120 and the first surface of the main board portion 111, and the cover plate 120 is bonded to the first surface of the main board portion 111 of the support 110 through the first adhesive layer 130. For the connection between the lapping rim 114 and the housing 200, a second adhesive layer 180 may be arranged between the lapping rim 114 and the housing 200, and the second adhesive layer 180 may be an annular adhesive layer bonded between the lapping rim 114 of the support 110 and the inner surface (outer surface) of the housing 200.

In addition, in this embodiment, a screen adhesive layer 40 bonded between the screen 20 and the middle frame 30, frame adhesive bonded between the inner surface of the housing 200 and the middle frame 30, the first adhesive layer 130 bonded between the cover plate 120 and the support 110, and the second adhesive layer 180 bonded between the lapping rim 114 of the support 110 and the inner surface (outer surface) of the housing 200 may all be adhesive layers formed by double-sided adhesive layers, or adhesive dispensing layers formed through a dispensing process, or may be adhesive layers formed by a combination of an adhesive layer and an adhesive dispensing layer.

Referring to FIG. 8A, the main board portion 111 of the support 110 of the decorative member 100 is provided with an accommodating hole 1111, and a component in a camera module that needs to receive light or emits light to outside are exposed in the accommodating hole 1111, so that the corresponding component can receive external light or emit light to outside. Exemplarily, the camera module including only one camera is used as an example. Only one accommodating hole 1111 may be provided on the main board portion 111 of the support 110, and a light-incident end of the camera is exposed in the accommodating hole 1111. The camera module including at least two cameras is used as an example. More than two accommodating holes 1111 may be provided on the main board portion 111 of the support 110, and light-incident ends of the cameras are arranged in a one-to-one correspondence with the accommodating holes 1111. In addition to the camera, for the camera module including components such as a flash and a sensor, the plurality of accommodating holes 1111 provided on the main board portion 111 of the support 110 further include accommodating holes 1111 corresponding to the flash and the sensor.

It should be noted that, the shape of the accommodating hole 1111 shown in FIG. 8A is a circle by way of example. In practical application, for different components arranged inside different accommodating holes 1111, the accommodating hole 1111 may further be in a rectangular shape, an elliptical shape, or another shape. The flash in the camera module is used as an example. If the outline shape of a light emitting surface of the flash is a rectangle, the corresponding accommodating hole 1111 may also be designed in a rectangular shape. In addition, based on the layout structure of components such as the camera, the flash, and the sensor in the camera module, the accommodating holes 1111 on the main board portion 111 of the support 110 may be randomly arranged. The outline of the decorative member 100 being a circle is used as an example. One accommodating hole 1111 may be provided in the center of the main board portion 111 of the support 110, and the remaining accommodating holes 1111 may be arranged around an outer circumference of the accommodating hole 1111 in the center and at intervals in the circumferential direction of the main board portion 111.

Still referring to FIG. 8A, the support 110 of the decorative member 100 is further provided with a balance hole 140, and the balance hole 140 is configured to communicate the inside of the electronic device 1 with the outside. With reference to FIG. 6 and FIG. 7, the balance hole 140 is covered with a balance valve 150, and the balance valve 150 can prevent foreign matters such as water vapor and dust in the external environment from entering the electronic device 1 while ensuring the communication of the inside with the outside of the electronic device 1. When the housing 200 of the electronic device 1 is pressed and the air pressure in the accommodating space of the electronic device 1 increases, the air pressure inside the electronic device 1 is kept in balance through venting to outside by using the balance valve 150, so as to avoid the polarization of the diaphragm of the audio device 50 and prevent the electronic device 1 from producing noise.

For the case that the inside of the electronic device 1 is in communication with the outside through the balance valve 150, referring to FIG. 7, due to the existence of an assembly gap, a gap inevitably exists between the periphery of the cover plate 120 and the inner edge of the decorative ring 112, the gap forms a first vent gap a of the decorative member 100, and the balance hole 140 may be in communication with the first vent gap a. In this way, air can flow inside and outside the electronic device 1 through the first vent gap a and the balance valve 150, so as to balance the air pressure difference inside and outside the electronic device 1.

Figure 8B:
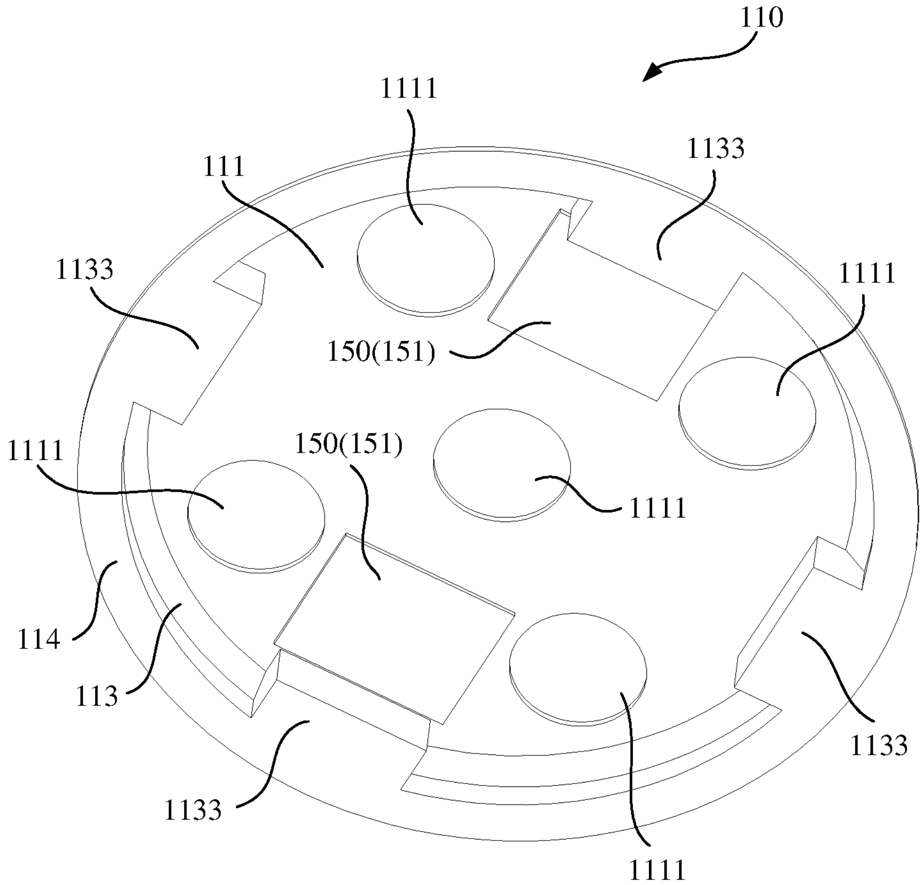
FIG. 8B is a bottom structural view of the support of the decorative member in FIG. 5.

FIG. 8B is a bottom structural view of the support of the decorative member in FIG. 5. FIG. 8B shows a structure of the support 110 facing a side of the inner surface of the housing 200. As shown in FIG. 7 and FIG. 8B, as an example, a spacing between the second surface of the support 110 and the support plate 302 of the middle frame 30 is relatively large, which facilitates the arrangement of the first balance valve 151. Therefore, the second surface of the main board portion 111 may be covered with the first balance valve 151, that is, a side of the first balance hole 141 facing the inside of the electronic device 1 is covered with the first balance valve 151.

In another example, when the thickness of the first adhesive layer 130 is sufficient and the gap between the cover plate 120 and the main board portion 111 of the support 110 is sufficient to arrange the first balance valve 151, the first balance valve 151 may also be arranged on the first surface of the support 110, that is, a side of the first balance hole 141 facing the cover plate 120 is covered with the first balance valve 151. Alternatively, if the gap between the cover plate 120 and the main board portion 111 of the support 110 is relatively small, a mounting groove (not shown in the figure) may be provided on the main board portion 111. The mounting groove is recessed from the first surface to the second surface of the main board portion 111, and the mounting groove is arranged around an outer circumference of the first balance hole 141. An edge part of the first balance valve 151 may be attached to a groove bottom of the mounting groove. The mounting groove may provide a mounting space for the first balance valve 151, and may also locate the first balance valve 151.

The first balance valve 151 is attached to the second surface of the main board portion 111 and the first balance valve 151 covers the side of the first balance hole 141 facing the inside of the electronic device 1 by way of example for description below.

In addition, the first balance valve 151 covering the first balance hole 141 may be a waterproof breathable film, and the waterproof breathable film may allow air to pass through smoothly while isolating foreign matters such as dust and water vapor in the external environment, and has the functions of waterproof, dust proof, and balancing the air pressure inside and outside the electronic device 1. Alternatively, the first balance valve 151 may also be a dust filter. Since the cover plate 120 of the decorative member 100 has played a good protective role, the first vent gap a between the cover plate 120 and the decorative ring 112 of the support 110 is tiny, which can prevent foreign matters from entering the decorative member 100. In addition, the dust filter arranged on the support 110 can effectively prevent foreign matters such as dust and water vapor from entering the electronic device 1.

Figure 9:
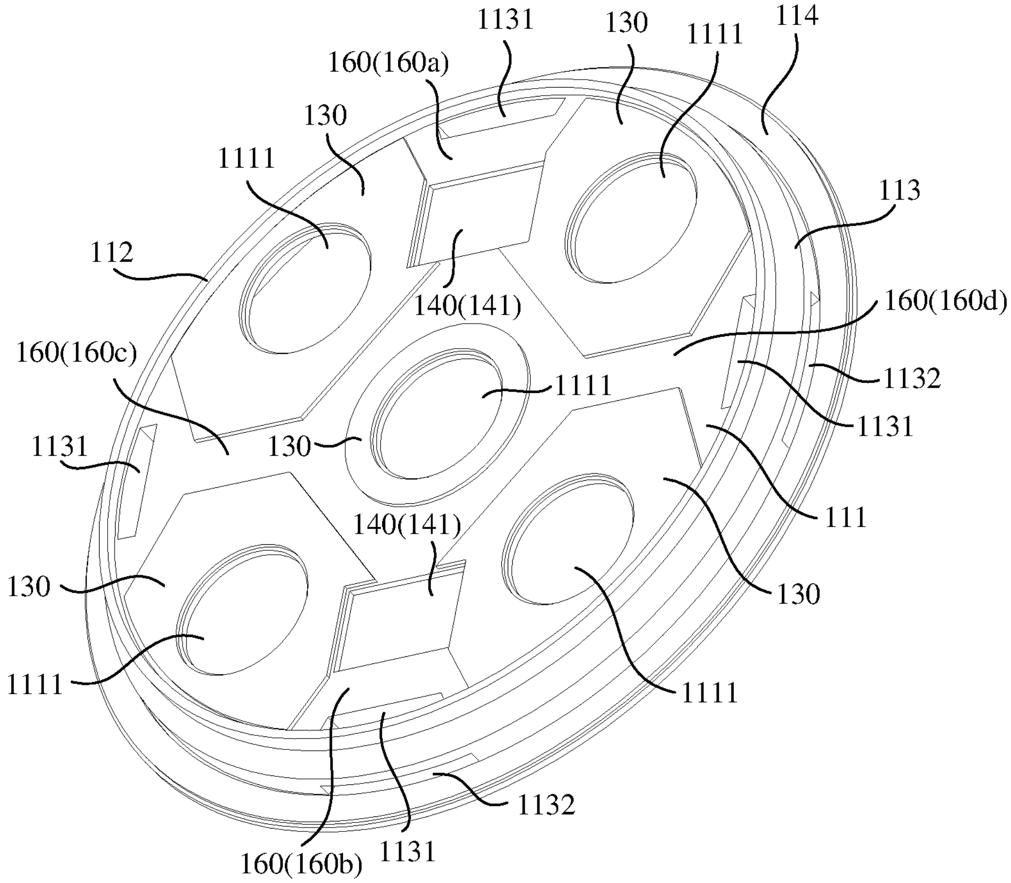
FIG. 9 is a schematic structural diagram of the decorative member in FIG. 5 with a cover plate being removed.

FIG. 9 is a schematic structural diagram of the decorative member in FIG. 5 with a cover plate being removed. Referring to FIG. 8 and FIG. 9, the balance hole 140 provided on the support 110 includes a first balance hole 141 located on the main board portion 111, and correspondingly, the balance valve 150 includes a first balance valve 151 covering the first balance hole 141. Moreover, the first adhesive layer 130 arranged between the main board portion 111 and the cover plate 120 does not completely cover the first surface of the main board portion 111, and a vent channel 160 is formed between a region of the first surface of the main board portion 111 not covered with the first adhesive layer 130 and the cover plate 120. The vent channel 160 is connected to an edge of the main board portion 111 and in communication with the first vent gap a, and the first balance hole 141 is in communication with the vent channel 160.

When the housing 200 of the electronic device 1 is pressed and needs to vent air, the air in the accommodating space of the electronic device 1 passes through the first balance valve 151 covering the first balance hole 141, then flows to the first vent gap a on the periphery of the decorative member 100 along the vent channel 160, and finally flows out from the first vent gap a, so as to balance the air pressure inside and outside the electronic device 1. The gas in the electronic device 1 flows to the outside along the vent path of the decorative member 100, which may not cause the air pressure in the accommodating space of the electronic device 1 to fluctuate greatly, and may not affect the vibration of the diaphragm of the audio device 50, so that the electronic device 1 may not produce noise.

It should be noted that, to ensure the sealing performance of the decorative member 100 to the camera module, the first adhesive layer 130 arranged between the first surface of the main board portion 111 and the cover plate 120 should be arranged around an outer circumference of each accommodating hole 1111. That is to say, the first adhesive layer 130 completely surrounds the outer circumference of the accommodating hole 1111, and the cover plate 120, the first adhesive layer 130, and the main board portion 111 of the support 110 jointly enclose the outer circumference of the accommodating hole 1111 to form a sealed space, so as to hermetically protect the camera module. In designing the vent channel 160 formed between the main board portion 111 and the cover plate 120, it should be ensured that the first adhesive layer 130 completely surrounds the outer circumference of the accommodating hole 1111, and a specific spacing should be defined between the formed vent channel 160 and the accommodating hole 1111.

In this embodiment, at least two first balance holes 141 are provided on the main board portion 111 of the support 110, at least two vent channels 160 are formed between the main board portion 111 and the cover plate 120, and the vent channels 160 are in communication with each other. The first balance hole 141 may be located on the path of any vent channel 160, or the first balance hole 141 may be provided at an intersection of the vent channels 160. After gas in the accommodating space of the electronic device 1 passes through the first balance valve 151 covering the first balance hole 141 and enters the vent channel 160, the gas may flow from any vent channel 160 to the first vent gap a along the path of the vent channel 160 and is discharged from the first vent gap a.

In this way, the problem of insufficient venting amount of the balance valve 150 covering a single balance hole 140 is avoided, and the venting amount requirement of the electronic device 1 can be satisfied by simultaneous venting air to outside through at least two balance valves 150 covering the balance hole 140. In addition, air is vented to outside through a plurality of balance valves 150 and a plurality of vent paths. If one of the balance valves 150 is blocked or a local region of one vent channel 160 is blocked, even if the vent path of one balance valve 150 is blocked, the gas in the accommodating space of the electronic device 1 may further be vented to outside from the balance valve 150 covering another balance hole 140 via another vent channel 160, so that the gas in the accommodating space can be smoothly discharged and the venting failure can be avoided.

Still referring to FIG. 9, for example, the accommodating hole 1111 provided on the main board portion 111 of the support 110 includes one accommodating hole 1111 located in the center of the support 110 and four accommodating holes 1111 located on the outer circumference of the accommodating hole 1111 and arranged at intervals in the circumferential direction. As an example, the vent channel 160 may include a first channel 160*a*, a second channel 160*b*, a third channel 160*c*, and a fourth channel 160*d*. The four channels all extend from the outer circumference of the accommodating hole 1111 in the center to the edge of the main board portion 111, ends of the four channels close to the center of the main board portion 111 of the support 110 are in communication with each other, and the first channel 160*a*, the second channel 160*b*, the third channel 160*c*, and the fourth channel 160*d* are respectively arranged between every two adjacent accommodating holes 1111 around the outer circumference. The two first balance holes 141 on the main board portion 111 are respectively located on the first channel 160*a* and the third channel 160*c*.

It may be understood that in practical application, the accommodating hole 1111 on the support 110 may be of another arrangement structure, and the vent channel 160 and the first balance hole 141 on the main board portion 111 of the support 110 may also be of other designs, which are not specifically limited in this embodiment.

In addition, in this embodiment, to effectively ensure the venting capability of the electronic device 1, the plurality of first balance holes 141 provided on the main board portion 111 of the support 110 are arranged as dispersedly as possible, so as to avoid the risk that all the first balance valves 151 are blocked due to excessive concentration of the first balance valves 151, and prevent the venting failure. Moreover, if the first balance holes 141 are excessively concentrated, the vent channels 160 in communication with the first balance holes 141 may also be relatively concentrated, and if the region of the first vent gap a correspondingly in communication with the vent channels 160 is blocked, the venting failure may also be caused.

For example, the main board portion 111 of the support 110 shown in FIG. 9 is provided with two first balance holes 141. If the main board portion 111 is divided into two regions with the center line as a dividing line, which are respectively a first region and a second region located on two sides of the center line, one of the two first balance holes 141 may be located in the first region and the other may be located in the second region, so as to ensure that the first balance holes 141 are arranged in both the first region and the second region, so as to avoid the concentrated arrangement of the first balance holes 141 and the venting failure of the electronic device 1.

It may be understood that three, four, or even more first balance holes 141 may also be provided on the main board portion 111 of the support 110. Like two first balance holes 141, a plurality of first balance holes 141 are dispersedly provided on the main board portion 111 of the support 110, the first balance holes 141 are provided in both the first region and the second region, and the details are not described again.

Moreover, through disperse arrangement of the plurality of first balance holes 141 on the main board portion 111 of the support 110, the first balance hole 141 closer to the pressing part exists at any part of the housing 200 that the user presses, and for the region around the pressing part, a greater air pressure change leads to a larger venting flow of the first balance valve 151 closer to the pressing part. In addition, the plurality of first balance valves 151 simultaneously perform venting, so that the pressure inside the electronic device 1 can be quickly vented.

In practical application, when a user operates an electronic device 1 such as a mobile phone, an easy-to-press region that is easy to be pressed at a high frequency exists on the housing 200 of the electronic device 1. Especially for the decorative member 100 protruding from the housing 200, fingers of the user can easily press some regions on the decorative member 100. In this embodiment, the plurality of first balance holes 141 provided on the main board portion 111 of the support 110 may include a main balance hole (not shown in the figure), and the main balance hole may be located in an easy-to-press region of the support 110. The easy-to-press region of the support 110 corresponds to the easy-to-press region of the decorative member 100, and the first balance valve 151 covering the main balance hole is defined as a main balance valve (not shown in the figure).

When the easy-to-press region of the decorative member 100 is pressed, the air pressure in the space around the easy-to-press region in the electronic device 1 increases, and the pressure inside the electronic device 1 can be quickly vented through the main balance valve in the region. Since the easy-to-press region of the decorative member 100 is a region that the user repeatedly presses at a high frequency, the internal and external pressures of the electronic device 1 can be balanced more quickly and effectively by arranging the main balance valve in the easy-to-press region.

Based on the layout structure of the decorative member 100 on the housing 200 and the actual operation mode of the user, one or at least two easy-to-press regions may exist on the decorative member 100, and correspondingly, the plurality of first balance holes 141 on the main board portion 111 of the support 110 may include one or at least two main balance holes, which is not limited in this embodiment. An area of the main balance hole may be greater than an area of another balance hole 140. In this way, the area of the main balance valve covering the main balance hole is larger, and the venting efficiency of the main balance valve is higher, which is helpful to quickly vent the pressure in the electronic device 1.

Figure 10:
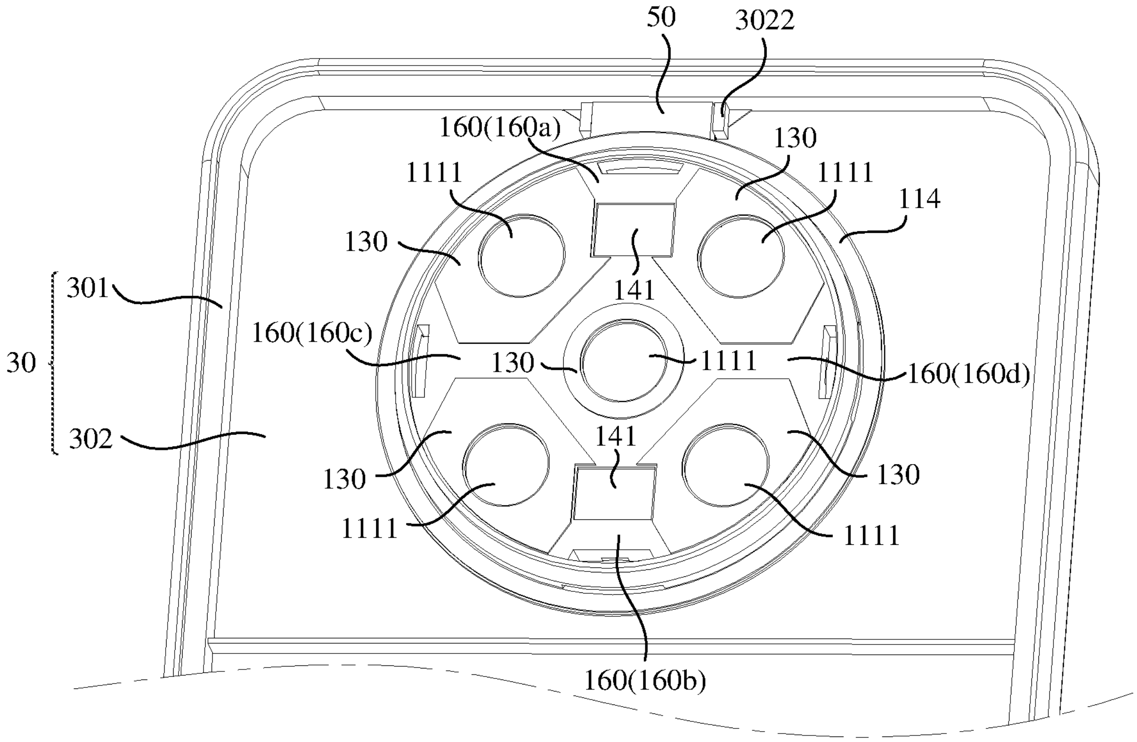
FIG. 10 is a schematic diagram of an orientation of the decorative member in FIG. 5 on a middle frame with the cover plate being removed.
Figure 11:
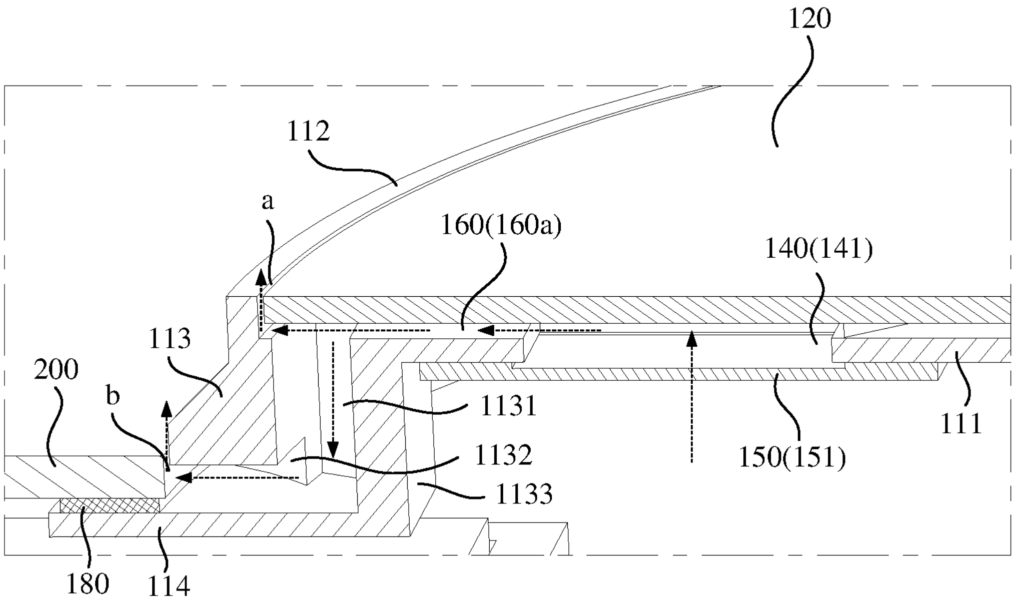
FIG. 11 is a partial enlarged view of A in FIG. 7.

FIG. 10 is a schematic diagram of an orientation of the decorative member in FIG. 5 on a middle frame with the cover plate being removed, and FIG. 11 is a partial enlarged view of A in FIG. 7. For example, the vent channel 160 shown in FIG. 10 includes a first channel 160*a* extending to the top of the electronic device 1, the first channel 160*a* is in communication with a region of the first vent gap a corresponding to a top end of the decorative member 100, and the first channel 160*a* is provided with a first balance hole 141. The dashed arrow in FIG. 11 gives an example of a vent path. Referring to FIG. 11, gas in the accommodating space of the electronic device 1 passes through the first balance valve 151, passes through the first balance hole 141, and enters the first channel 160*a*. The gas flows to the first vent gap a along the first channel 160*a*, and then flows to the outside through the first vent gap a.

In addition, as shown in FIG. 7 and FIG. 11, when the lapping rim 114 of the support 110 is connected to the inner surface of the housing 200, and the side wall 113 of the support 110 protrudes outward through the mounting hole 210 in the housing 200, a second vent gap b is formed between an outer wall surface of the side wall 113 of the support 110 and a hole wall of the mounting hole 210 of the housing 200 due to existence of an assembly gap. To effectively ensure the venting effect of the electronic device 1, the electronic device 1 of this embodiment may further use the second vent gap b for venting during venting to outside by using the first vent gap a, so as to reduce the risk of venting failure caused by local blockage of the first vent gap a.

The outer wall surface of the side wall 113 of the support 110 is a side wall surface of the side wall 113 facing the hole wall of the mounting hole 210 of the housing 200. In contrast, the inner wall surface of the side wall 113 of the support 110 is a side wall surface of the side wall 113 facing the center of the support 110.

As shown in FIG. 9 and FIG. 11, to allow the electronic device 1 to vent air to outside through the second vent gap b, the side wall 113 of the support 110 of the decorative member 100 is further provided with an air guide groove 1131 and a communication groove 1132. A notch of the air guide groove 1131 is located on a first surface of the main board portion 111, and the notch of the air guide groove 1131 is in communication with the vent channel 160. Exemplarily, the notch of the air guide groove 1131 may be located on a path of the vent channel 160. The air guide groove 1131 extends in an extending direction of the side wall 113, and a groove bottom of the air guide groove 1131 extends to an end of the side wall 113 connected to the lapping rim 114, so that the groove bottom of the air guide groove 1131 can extend to a region corresponding to a plane where the housing 200 is located. The communication groove 1132 may be arranged corresponding to the hole wall of the mounting hole 210, the notch of the communication groove 1132 is located on the outer wall surface of the side wall 113 of the support 110, and the communication groove 1132 extends to the inner wall surface of the side wall 113 to be in communication with the air guide groove 1131.

Referring to FIG. 11, the air in the accommodating space of the electronic device 1 passes through the first balance valve 151 and the first balance hole 141, and then enters the first channel 160*a*. The gas flows to the notch of the air guide groove 1131 along the first channel 160*a*, then flows to the second vent gap b through the air guide groove 1131 and the communication groove 1132, and finally flows to the outside through the second vent gap b.

It should be noted that, FIG. 11 only shows the vent path close to the top of the middle frame 30 in FIG. 10, and an air guide groove 1131 is provided at a part on the side wall 113 of the support 110 that is close to the top of the middle frame 30. Therefore, at the part of the decorative member 100 close to the top of the middle frame 30, the decorative member 100 not only can vent air to outside through the first vent gap a, but also can vent air to outside through the second vent gap b via the air guide groove 1131. As shown in FIG. 9, the side wall 113 of the support 110 may be provided with a plurality of air guide grooves 1131, and the plurality of air guide grooves 1131 are arranged at intervals in the circumferential direction of the side wall 113 of the support 110. In the figure, the side wall 113 is provided with four air guide grooves 1131 at even intervals in the circumferential direction by way of example. The air guide grooves 1131 are all in communication with the vent channel 160, so that during venting, the gas in the electronic device 1 may further be vented to outside through the second vent gap b via any air guide groove 1131 on the side wall 113 of the support 110, which increases the vent paths and reduces the risk of venting failure caused by blockage of one or some of the vent paths while ensuring the venting amount.

In practical application, a thickness of the side wall 113 of the support 110 of the decorative member 100 is usually thin, so as to reduce the overall thickness of the support 110 and realize the thinness of the decorative member 100. As shown in FIG. 8B and FIG. 11, when the thickness of the side wall 113 of the support 110 cannot satisfy the requirement of forming the air guide groove 1131, in this embodiment, the side wall 113 of the support 110 is additionally provided with an inner extension 1133. The inner extension 1133 protrudes from an inner wall surface of the side wall 113 toward the center of the support 110, and the thickness of the side wall 113 of the support 110 is increased through the inner extension 1133. Therefore, the air guide groove 1131 may be provided on the inner extension 1133. In addition, the inner extension 1133 does not affect the shape and size of the outer wall surface of the side wall 113, the overall size of the support 110, and the assembly of the support 110 and the housing 200.

For the case that a plurality of air guide grooves 1131 are arranged at intervals on the side wall 113 of the support 110 in the circumferential direction, as shown in FIG. 8B, a plurality of inner extensions 1133 may be arranged at intervals on the side wall 113 in the circumferential direction, and each of the inner extensions 1133 is provided with an air guide groove 1131. Exemplarily, one air guide groove 1131 may be provided on each inner extension 1133, or at least two air guide grooves 1131 may also be arranged at intervals on each inner extension 1133. On the premise that the area of the main board portion 111 of the support 110 is sufficient and does not affect the arrangement of the accommodating hole 1111, the inner extension 1133 may also surround the entire circumference of the side wall 113, which is equivalent to increasing the overall thickness of the side wall 113 of the support 110. In this case, the air guide groove 1131 may be provided at any part of the side wall 113 of the support 110 based on design requirements.

Figure 12A:
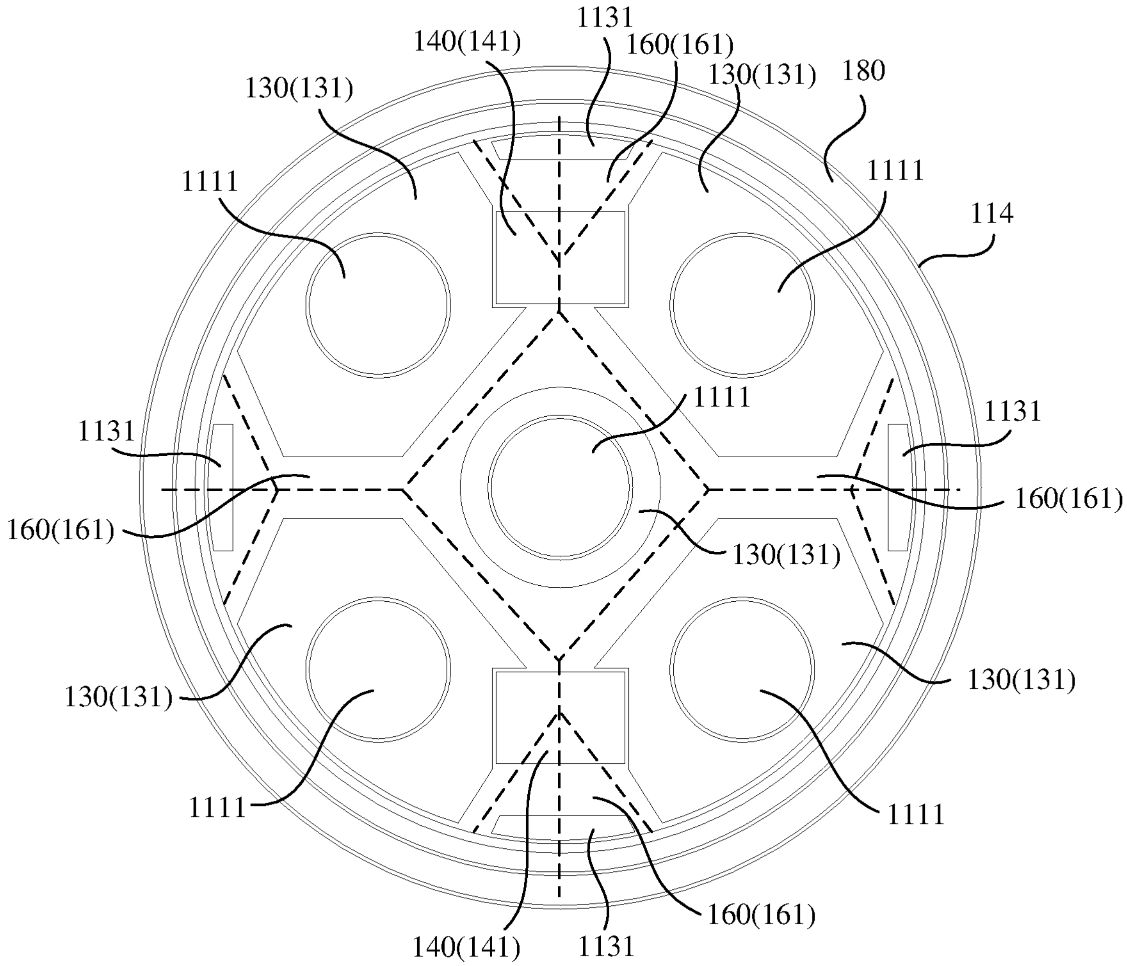
FIG. 12A is a schematic diagram of a layout of a first adhesive layer on a support according to an embodiment of this application.
Figure 12B:
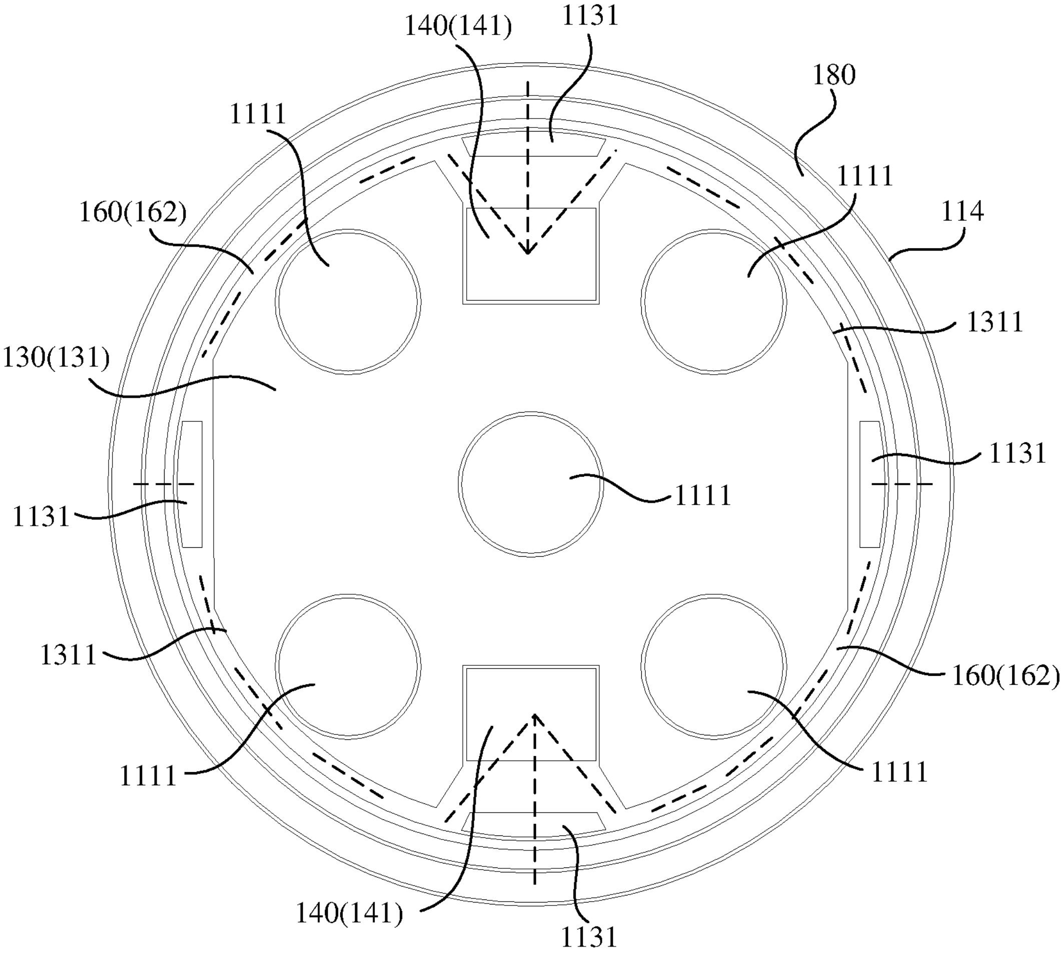
FIG. 12B is a schematic diagram of another layout of a first adhesive layer on a support according to an embodiment of this application.
Figure 12C:
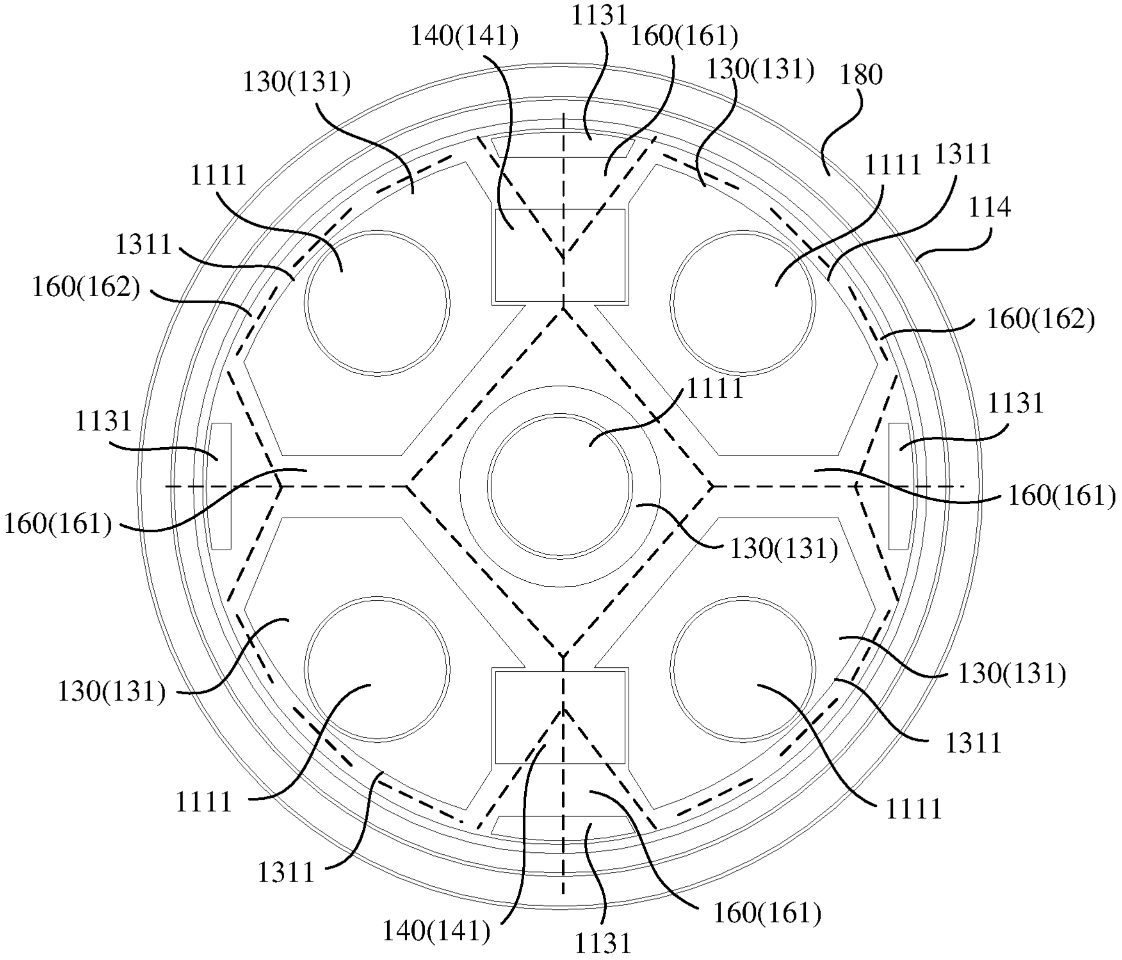
FIG. 12C is a schematic diagram of a third layout of a first adhesive layer on a support according to an embodiment of this application.

FIG. 12A is a schematic diagram of a layout of a first adhesive layer on a support according to an embodiment of this application; FIG. 12B is a schematic diagram of another layout of a first adhesive layer on a support according to an embodiment of this application; and FIG. 12C is a schematic diagram of a third layout of a first adhesive layer on a support according to an embodiment of this application.

For the specific layout structure of the first adhesive layer 130 bonded to the first surface of the main board portion 111 of the support 110 and the structural form of the formed vent channel 160, referring to FIG. 12A, as an implementation, the first adhesive layer 130 bonded to the first surface of the main board portion 111 may include at least two adhesive sheets 131. The adhesive sheets 131 are isolated from each other, and an edge of each of the adhesive sheets 131 extends to an edge of the main board portion 111. A gap between adjacent adhesive sheets 131 forms a vent channel 160 between the main board portion 111 and the cover plate 120. In this embodiment, the vent channel 160 formed in this way is defined as a first vent channel 161. The first vent channel 161 between adjacent adhesive sheets 131 extends from the middle to the edge of the main board portion 111, and an end of the first vent channel 161 corresponds to a local region of the first vent gap a.

A plurality of first vent channels 161 extending from the middle to the edge of the main board portion 111 may intersect and be in communication with each other at respective end regions close to the middle of the main board portion 111, or may intersect with another first vent channel 161 on middle sections in respective extending directions. In this case, the first balance hole 141 on the main board portion 111 may be arranged in a middle region in the extending direction of the first vent channel 161.

The layout structure of the support 110 shown in FIG. 12A is used as an example. The first adhesive layer 130 may include five adhesive sheets 131. The five adhesive sheets

131 surround the outer circumferences of the five accommodating holes 1111 in a one-to-one correspondence, and the adhesive sheets 131 are isolated from each other. In this way, four first vent channels 161 are formed between four adhesive sheets 131 located around the outer circumference. The four first vent channels 161 intersect with each other on the peripheral side of the adhesive sheet 131 located at the center, and the four channels all extend to the edge of the main board portion 111. The dashed line in the figure shows the vent path. The gas in the electronic device 1 may freely flow along the first vent channels 161 in communication with each other after passing through the first balance valve 151, and is discharged through the first vent gap a and the second vent gap b.

Referring to FIG. 12B, as another implementation, the first adhesive layer 130 bonded between the first surface of the main board portion 111 and the cover plate 120 may also be an integral adhesive sheet 131, and the middle region of the adhesive sheet 131 may be opened corresponding to the accommodating holes 1111, so that the adhesive sheet 131 is arranged around the outer circumference of all accommodating holes 1111. In addition, the edge of the adhesive sheet 131 forms a notch section 1311. The notch section 1311 is located between the adjacent first balance holes 141, a spacing is defined between the notch section 1311 and the edge of the main board portion 111, and a gap between the notch section 1311 and the decorative ring 112 forms a vent channel 160. In this embodiment, the vent channel 160 formed in this way is defined as a second vent channel 162. The second vent channel 162 located between the notch section 1311 on the outer edge of the adhesive sheet 131 and the decorative ring 112 extends along the periphery of the main board portion 111, and the second vent channel 162 exactly faces the first vent gap a.

The first balance hole 141 may be in communication with the end of the second vent channel 162 extending along the periphery of the main board portion 111, two ends of the second vent channel 162 are respectively in communication with two adjacent second balance holes 142, and the second vent channels 162 located on two sides of the second balance holes 142 are in communication with each other through the second balance holes 142.

The layout structure of the support 110 shown in FIG. 12B is used as an example. The integral first adhesive layer 130 surrounds five accommodating holes 1111 on the main board portion 111 of the support 110, and parts on the first adhesive layer 130 corresponding to two first balance holes 141 on two sides are open toward the edge of the main board portion 111. The notch section 1311 is formed on each of two sides of the two first balance holes 141 on the edge of the adhesive sheet 131. A spacing is defined between the notch section 1311 and the edge of the main board portion 111, and the notch sections 1311 on the two sides both extend to the opening corresponding to the first balance hole 141. The dashed line in the figure shows the vent path. The gas in the electronic device 1 may freely flow along the second vent channels 162 in communication with each other after passing through the first balance valve 151, and is discharged through the first vent gap a and the second vent gap b.

Referring to FIG. 12C, as a third implementation, in combination with the structural forms of FIG. 12A and FIG. 12B, the first adhesive layer 130 bonded between the main board portion 111 and the cover plate 120 may include at least two adhesive sheets 131. The adhesive sheets 131 are isolated from each other, and edges of the adhesive sheets 131 close to the edge of the main board portion 111 of the support 110 form a notch section 1311. A spacing is defined between the notch section 1311 and the edge of the main board portion 111 of the support 110, and a first vent channel 161 is formed between two adjacent adhesive sheets 131. The first vent channels 161 intersect with each other. A second vent channel 162 is formed between the notch section 1311 on the edge of the adhesive sheet 131 and the decorative ring 112, and the second vent channel 162 is in communication with the first vent channel 161.

The layout structure of the support 110 shown in FIG. 12C is used as an example. The first adhesive layer 130 may include five adhesive sheets 131 surrounding the outer circumference of the five accommodating holes 1111 in a one-to-one correspondence, and the adhesive sheets 131 are isolated from each other. In this way, four first vent channels 161 are formed between four adhesive sheets 131 located around the outer circumference. The four first vent channels 161 intersect with each other on the peripheral side of the adhesive sheet 131 located at the center, and the four channels all extend to the edge of the main board portion 111. Further, a second vent channel 162 is formed between the notch sections 1311 on the outer edges of the four adhesive sheets 131 located around the outer circumference and the decorative ring 112, and the second vent channel 162 is in communication with the ends of the first vent channels 161. The dashed line in the figure shows the vent path. The gas in the electronic device 1 may freely flow along the first vent channel 161 and the second vent channel 162 in communication with each other after passing through the first balance valve 151, and is discharged to outside through the first vent gap a and the second vent gap b.

Figure 13:
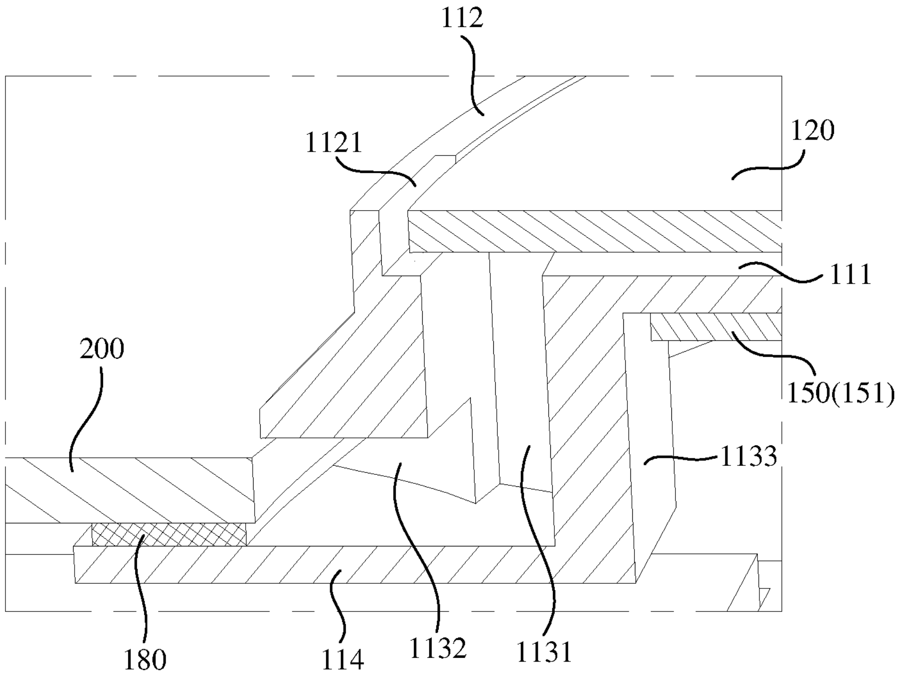
FIG. 13 is another partial structural diagram of the decorative member in FIG. 11.

FIG. 13 is another partial structural diagram of the decorative member in FIG. 11. As shown in FIG. 10 and FIG. 13, when the first vent gap a between the cover plate 120 of the decorative member 100 and the decorative ring 112 is formed, to increase the vent area, a stepped groove 1121 may further be provided on the decorative ring 112. The stepped groove 1121 corresponds to an end of the vent channel 160. The stepped groove 1121 extends from an inner wall surface to an outer wall surface of the decorative ring 112, and the stepped groove 1121 is in communication with a top end surface of the decorative ring 112. By providing the stepped groove 1121, the gap between the groove bottom of the stepped groove 1121 and the periphery of the cover plate 120 is increased, and a width of a local region of the first vent gap a corresponding to the vent channel 160 is increased, thereby increasing the vent area of the first vent gap a and improving the venting efficiency of the electronic device 1.

It should be noted that, the solution of providing the stepped groove 1121 on the decorative ring 112 is mainly aimed at the structural form in which the vent channel 160 formed between the support 110 and the cover plate 120 is the first vent channel 161. The end of the first vent channel 161 corresponds to the local region of the decorative ring 112, so that the stepped groove 1121 may be provided in the corresponding region of the decorative ring 112 to increase the vent area of the first vent gap a at a part of the end of the first vent channel 161. However, for the structure in which the second vent channel 162 is formed between the support 110 and the cover plate 120, the second vent channel 162 surrounds the edge of the main board portion 111, exactly faces the first vent gap a, and has a wide coverage region, and therefore has a large vent area. Moreover, since the second vent channel 162 surrounds the edge of the main board portion 111, the region of the second vent channel corresponding to the decorative ring 112 is large, and it is not convenient to locate the stepped groove 1121.

For the case that a plurality of first vent channels 161 respectively correspond to a plurality of local regions on the decorative ring 112, only one stepped groove 1121 may be provided on the decorative ring 112, and the stepped groove 1121 corresponds to the end of one of the first vent channels 161. Alternatively, a plurality of stepped grooves 1121 may be arranged at intervals on the decorative ring 112 in the circumferential direction, and the plurality of stepped grooves 1121 respectively correspond to the ends of the plurality of first vent channels 161.

Still referring to FIG. 13, similar to the stepped groove 1121 provided on the decorative ring 112 to increase the vent area of the first vent gap a, the volume of the communication groove 1132 provided on the side wall 113 of the support 110 may further be increased, so that the top wall of the communication groove 1132 (the inner wall of the communication groove 1132 close to a side of the first surface of the main board portion 111) is higher than a plane where the outer surface of the housing 200 is located, that is, a top region of the communication groove 1132 is exposed outside the housing 200. In this way, it is equivalent to increasing the width of the second vent gap b of a part where the communication groove 1132 is located, increasing the vent area of the second vent gap b, and improving the venting efficiency of the electronic device 1.

Alternatively, similar to the stepped groove 1121 on the decorative ring 112, a notch may be provided on the hole wall of the mounting hole 210 of the housing 200, the notch corresponds to the communication groove 1132, and the notch is recessed in a direction away from the decorative member 100, so that the width of the second vent gap b at the part where the communication groove 1132 is located can be increased through the notch.

Embodiment 2

Figure 14:
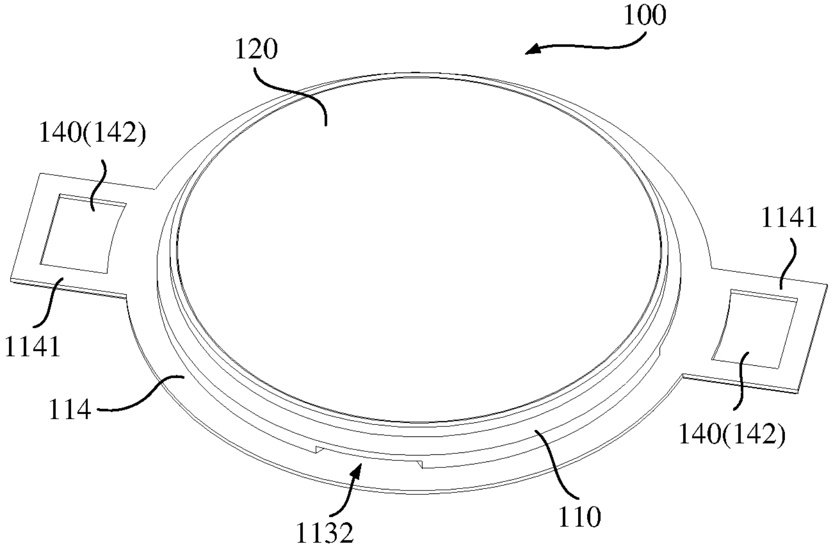
FIG. 14 is a schematic structural diagram of another decorative member according to an embodiment of this application.
Figure 15:
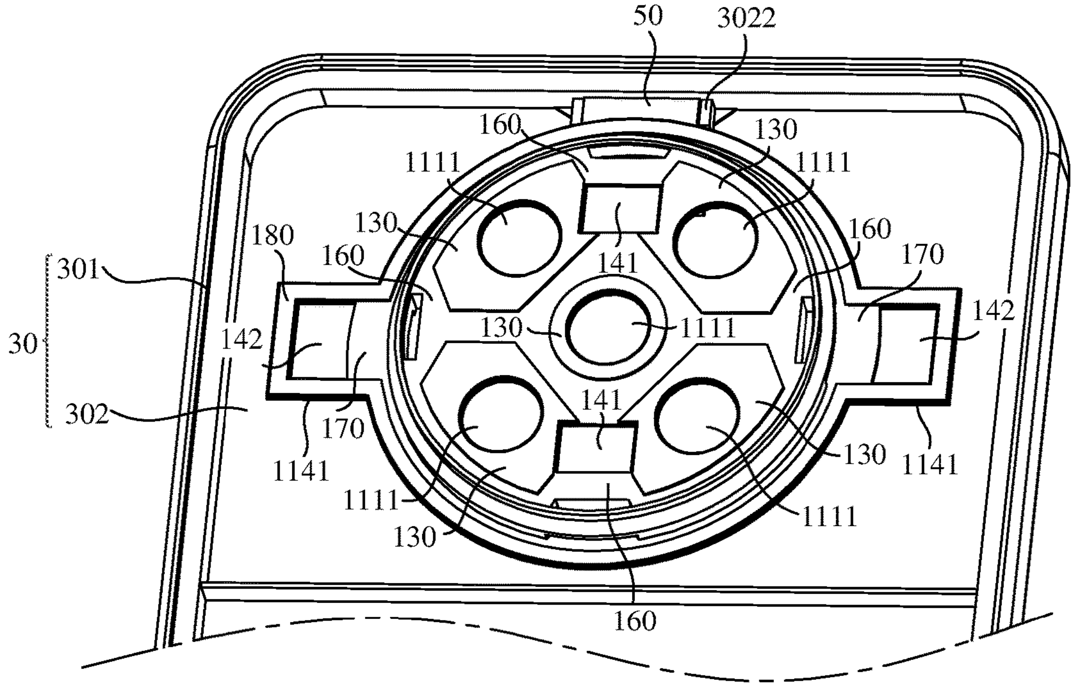
FIG. 15 is a schematic diagram of an orientation of the decorative member in FIG. 14 on a middle frame with the cover plate being removed.
Figure 16:
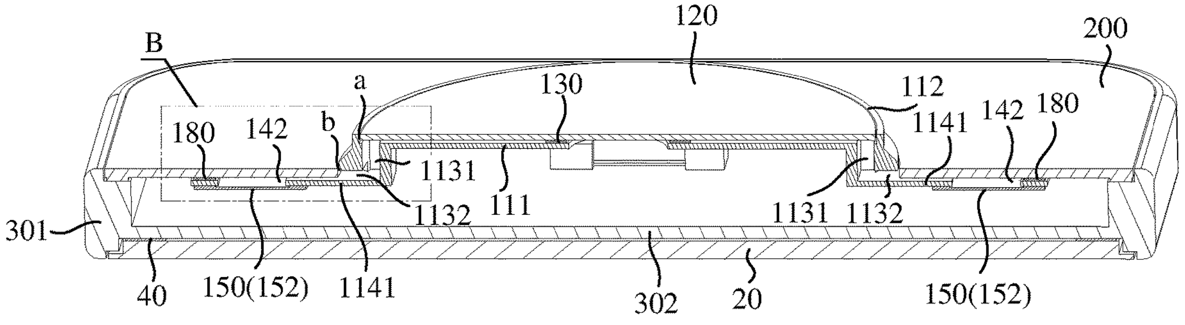
FIG. 16 is a schematic cross-sectional view of the electronic device in FIG. 1 taken along B-B with the decorative member in FIG. 14 being mounted.
Figure 17:
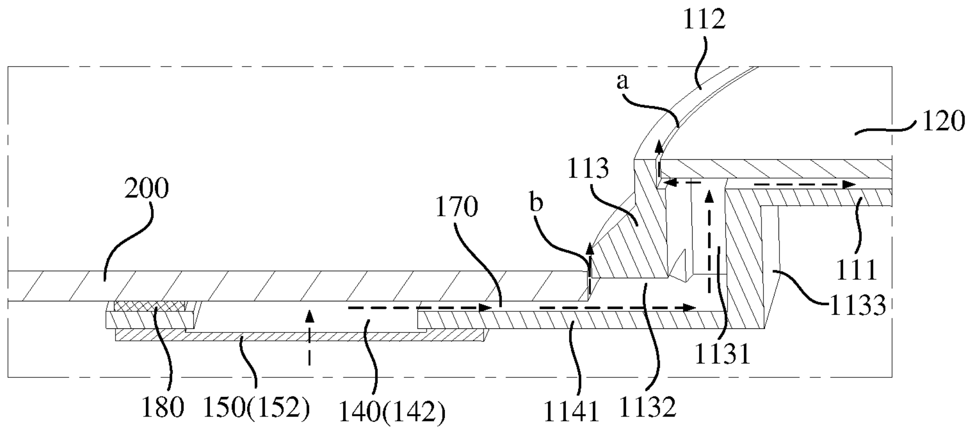
FIG. 17 is a partial enlarged view of B in FIG. 16.
Figure 18A:
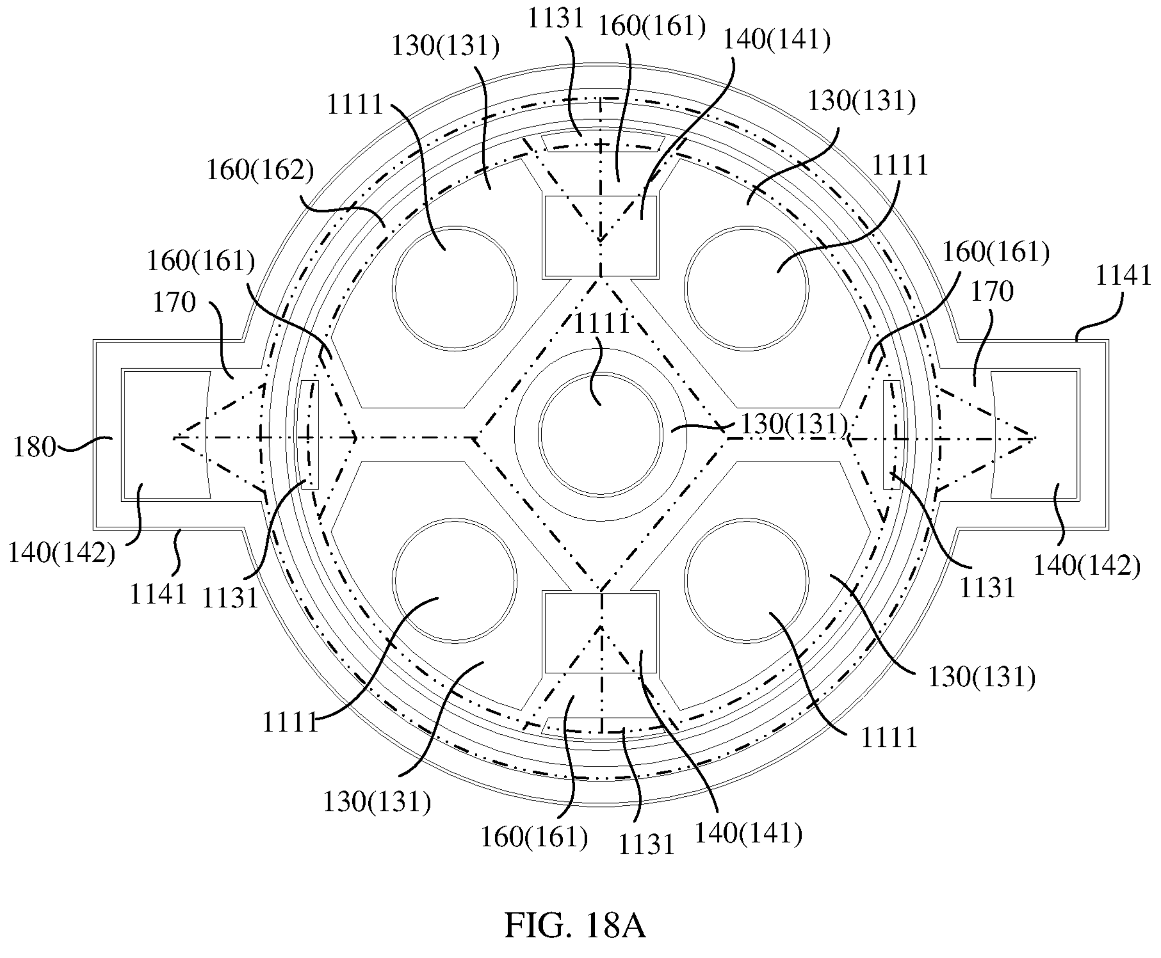
FIG. 18A is a layout structure diagram of the decorative member in FIG. 14 (with a cover plate being removed)
Figure 18B:
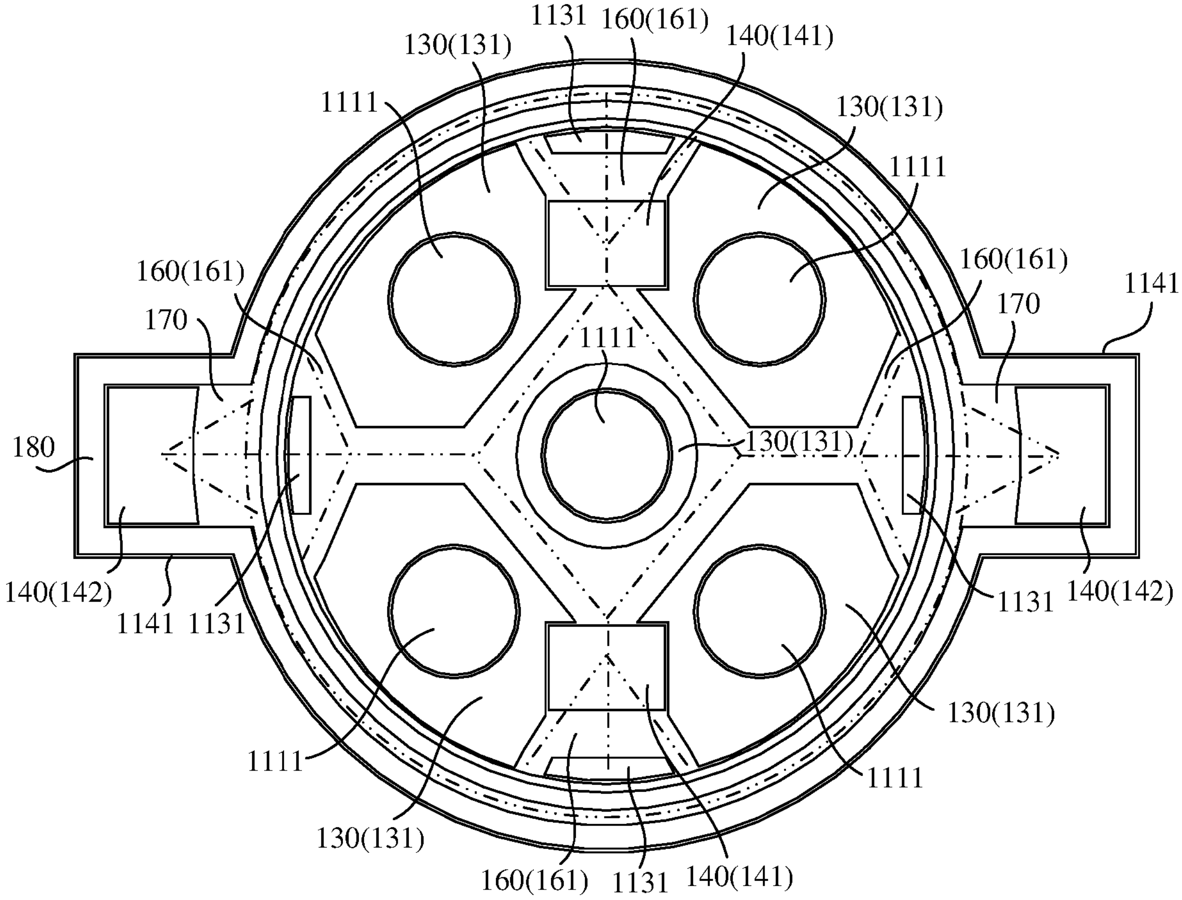
FIG. 18B is another layout structure diagram of the decorative member in FIG. 14 (with a cover plate being removed)
Figure 18C:
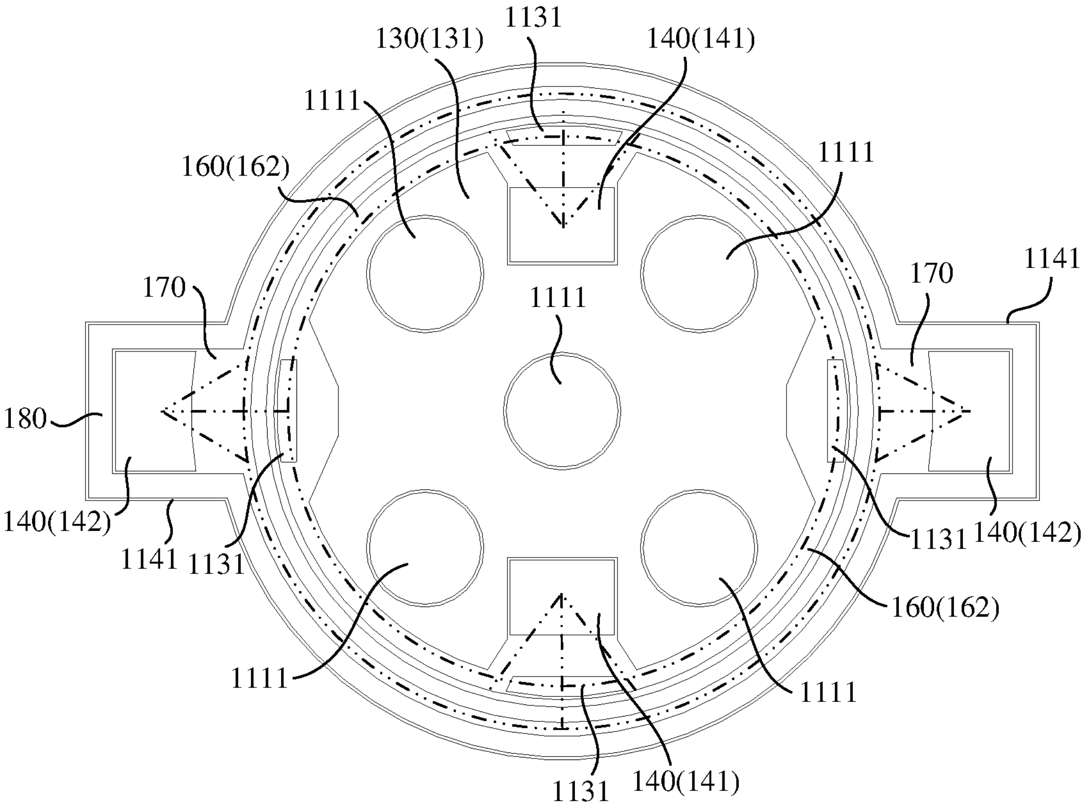
FIG. 18C is a third layout structure diagram of the decorative member in FIG. 14 (with a cover plate being removed)
Figure 18D:
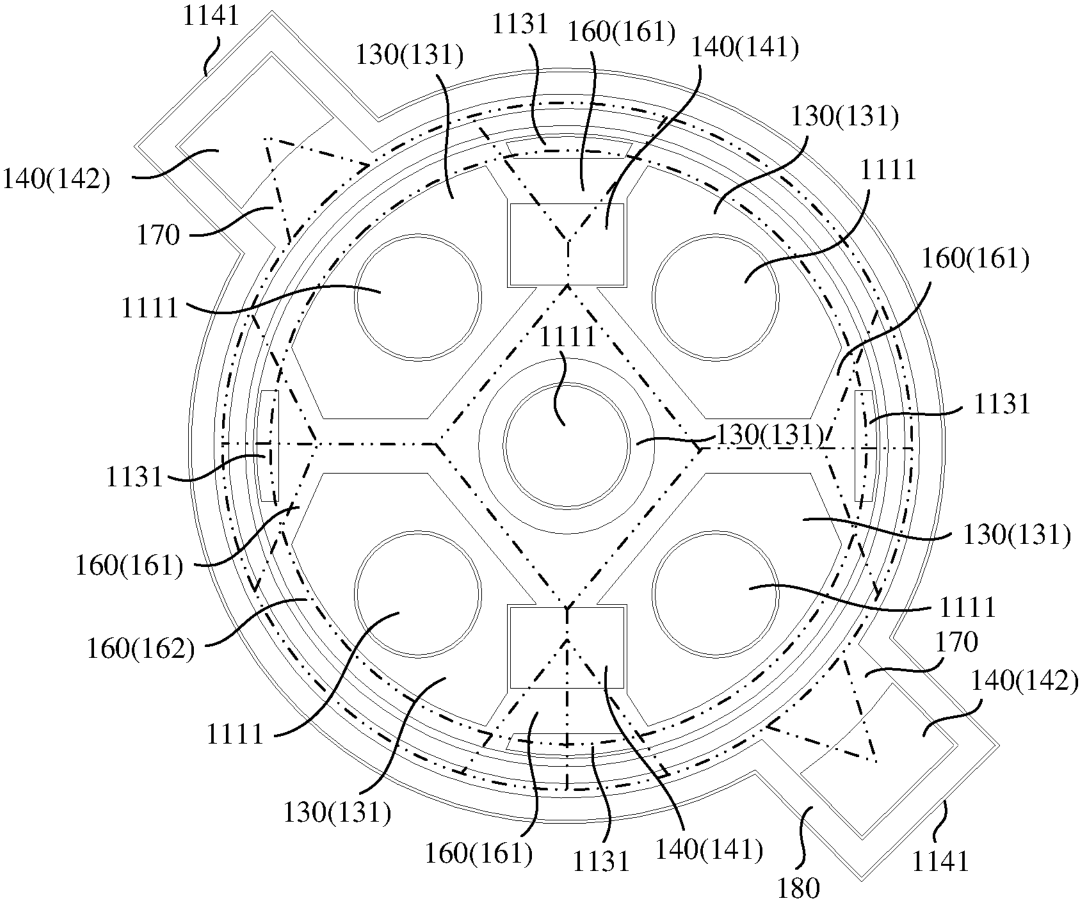
FIG. 18D is a fourth layout structure diagram of the decorative member in FIG. 14 (with a cover plate being removed)

FIG. 14 is a schematic structural diagram of another decorative member according to an embodiment of this application; FIG. 15 is a schematic diagram of an orientation of the decorative member in FIG. 14 on a middle frame with the cover plate being removed, and FIG. 16 is a schematic cross-sectional view of the electronic device in FIG. 1 taken along B-B with the decorative member in FIG. 14 being mounted; FIG. 17 is a partial enlarged view of B in FIG. 16; FIG. 18A is a layout structure diagram of the decorative member in FIG. 14 (with a cover plate being removed); FIG. 18B is another layout structure diagram of the decorative member in FIG. 14 (with a cover plate being removed); FIG. 18C is a third layout structure diagram of the decorative member in FIG. 14 (with a cover plate being removed); and FIG. 18D is a fourth layout structure diagram of the decorative member in FIG. 14 (with a cover plate being removed).

Referring to FIG. 14, based on the decorative member 100 provided in Embodiment 1, the structure of the support 110 is changed in this embodiment. This embodiment is mainly aimed at the structural form in which a lapping rim 114 of the support 110 is connected to an inner surface of the housing 200 of the electronic device 1, and the side wall 113 of the support 110 extends out of the electronic device 1 through the mounting hole 210 of the housing 200. By improving the structure of the lapping rim 114 of the support 110, more balance holes 140 and balance valves 150 are added, and more vent paths are added. Except for the structural change of the lapping rim 114 of the support 110, other layout structures of the decorative member 100 are all similar to those in Embodiment 1, and the details are not described herein again.

The lapping rim 114 of the support 110 of the decorative member 100 in this embodiment has a widened portion 1141. The widened portion 1141 extends toward outside of the support 110. By increasing the width of the lapping rim 114 through the widened portion 1141, a balance hole 140 may be added to the widened portion 1141. In this embodiment, the balance hole 140 provided on the widened portion 1141 is defined as a second balance hole 142, and the balance valve 150 covering the second balance hole 142 is defined as a second balance valve 152. In addition, when the support 110 shown in FIG. 15 is assembled to the electronic device 1, for example, the widened portion 1141 is arranged corresponding to the width direction of the electronic device 1. With reference to FIG. 16 and FIG. 17, the inner surface of the housing 200, the widened portion 1141, and the second adhesive layer 180 bonded between the housing 200 and the widened portion 1141 jointly define an air guide channel 170. The air guide channel 170 extends to the side wall 113 of the support 110 and is in communication with the vent channel 160 formed between the main board portion 111 and the cover plate 120 of the support 110, and the second balance hole 142 is located in the air guide channel 170.

Referring to FIG. 15, the second adhesive layer 180 bonded to the lapping rim 114 of the support 110 may be arranged as close as possible to the outer edge of the lapping rim 114, and the second adhesive layer 180 extends along the outer edge of the widened portion 1141 in the region of the widened portion 1141. In this way, most of the region of the widened portion 1141 may be located in the air guide channel 170 defined by the widened portion 1141, the housing 200, and the second adhesive layer 180, so that it can be ensured that the second balance hole 142 provided on the widened portion 1141 is located in the air guide channel 170.

Referring to FIG. 17, when venting is needed, the gas in the accommodating space of the electronic device 1 may further enter the air guide channel 170 through the second balance valve 152 covering the second balance hole 142 on the widened portion 1141, flow to the second vent gap b formed between the side wall 113 of the support 110 and the hole wall of the mounting hole 210 of the housing 200 through the air guide channel 170, and flow out from the second vent gap b. Alternatively, the gas entering the air guide channel 170 may also flow to the first vent gap a formed between the decorative ring 112 of the support 110 and the cover plate 120 through the communication groove 1132 and the air guide groove 1131 provided on the side wall 113, and flow out from the first vent gap a.

Since the air guide channel 170 is in communication with the side wall 113 of the support 110, and a second vent gap b is formed between the side wall 113 of the support 110 and the hole wall of the mounting hole 210 of the housing 200, the gas entering the air guide channel 170 may flow out through the second vent gap b. In addition, since the air guide channel 170 is in communication with the vent channel 160 formed between the main board portion 111 of the support 110 and the cover plate 120, the gas in the air guide channel 170 may further flow into any vent channel 160 in communication with each other, and is vented to outside through the vent channel 160 via the first vent gap a.

In this way, during venting of the first balance valve 151, the venting of the second balance valve 152 is increased by adding the second balance hole 142 to the widened portion 1141. If the first balance valve 151 is blocked, effective venting of the electronic device 1 may still be ensured by using the second balance valve 152. The air guide channel 170 in communication with the second balance valve 152 extends to the side wall 113 of the support 110, so as to ensure that the second balance valve 152 can vent air to outside through the second vent gap b. Based on this, refer to the vent path indicated by dashed lines in FIG. 18A to FIG. 18C. The second balance valve 152 may further vent air to outside through any vent channel 160 via the first vent gap a by bringing the air guide channel 170 into communication with all vent channels 160. The electronic device 1 vents air to outside through the first balance valve 151 and the second balance valve 152 via a plurality of vent paths, which reduces the risk of venting failure due to local vent paths being blocked.

Referring to FIG. 18A to FIG. 18C, in some implementations, the second balance hole 142 on the widened portion 1141 may correspond to the air guide groove 1131 on the side wall 113 of the support 110, the air guide channel 170 in communication with the second balance hole 142 is directly correspondingly in communication with the air guide groove 1131, and the air guide groove 1131 is in communication with the vent channel 160 formed between the main board portion 111 of the support 110 and the cover plate 120. In this case, the gas in the electronic device 1 passes through the second balance valve 152, directly enters the air guide groove 1131 through the air guide channel 170, and then enters the vent channel 160.

Similar to the layout structure of the first adhesive layer 130 on the main board portion 111 of the support 110 in Embodiment 1, by designing the structure of the first adhesive layer 130, the vent channel 160 formed between the main board portion 111 and the cover plate 120 may include both the first vent channel 161 and the second vent channel 162 (FIG. 18A). Alternatively, the vent channel 160 formed between the main board portion 111 and the cover plate 120 may include only the first vent channel 161 (FIG. 18B), or the vent channel 160 formed between the main board portion 111 and the cover plate 120 may include only the second vent channel 162 (FIG. 18C).

Referring to FIG. 18D, in some other implementations, in the circumferential direction of the support 110, the second balance hole 142 on the widened portion 1141 may be staggered with respect to the air guide groove 1131 on the side wall 113 of the support 110, and the air guide channel 170 formed between the widened portion 1141 and the housing 200 is also staggered with respect to the air guide groove 1131. Since the air guide channels 170 corresponding to the second balance holes 142 are in communication with each other in a ring shape around the side wall 113, in this case, the gas in the electronic device 1 passes through the second balance valve 152 and flows in the annular air guide channel 170 on the periphery of the side wall 113 of the support 110 until the gas flows to correspond to the air guide groove 1131 on the side wall 113, and then enters the vent channel 160 through the air guide groove 1131.

It may be understood that although the layout structure of the first adhesive layer 130 shown in FIG. 18D defines the vent channel 160 formed between the main board portion 111 and the cover plate 120 including both the first vent channel 161 and the second vent channel 162, by designing the first adhesive layer 130, similar to FIG. 18B and FIG. 18C, on the premise that the second balance hole 142 on the widened portion 1141 and the air guide groove 1131 on the side wall 113 of the support 110 are staggered with respect to each other, the vent channel 160 formed between the main board portion 111 and the cover plate 120 may include only the first vent channel 161 or the second vent channel 162.

In addition, to allow the electronic device 1 to vent air to outside through more balance valves 150, at least two second balance holes 142 may be arranged on the widened portion 1141, and the second balance valves 152 covering the second balance holes 142 are used to vent air to outside. In addition, a plurality of first balance valves 151 on the main board portion 111 of the support 110 can increase a quantity of balance valves 150 and increase parts covered by the balance valves 150, which can increase the venting area of the electronic device 1 and improve venting efficiency. In addition, air is vented to outside through the plurality of balance valves 150 and the plurality of vent paths, which can avoid the venting failure.

Still referring to FIG. 18A to FIG. 18D, as an implementation, at least two widened portions 1141 may be arranged at intervals in the circumferential direction of the lapping rim 114, and two widened portions 1141 are used as an example in the figure. It may be understood that three or more widened portions 1141 may also be arranged at intervals in the circumferential direction of the lapping rim 114. A second balance hole 142 is provided on each widened portion 1141. For example, a second balance hole 142 is provided on each widened portion 1141, or at least two second balance holes 142 are arranged at intervals on each widened portion 1141. The air guide channels 170 formed by the widened portions 1141 are in communication with each other, and the air guide channels 170 are in communication with the vent channel 160.

Figure 19:
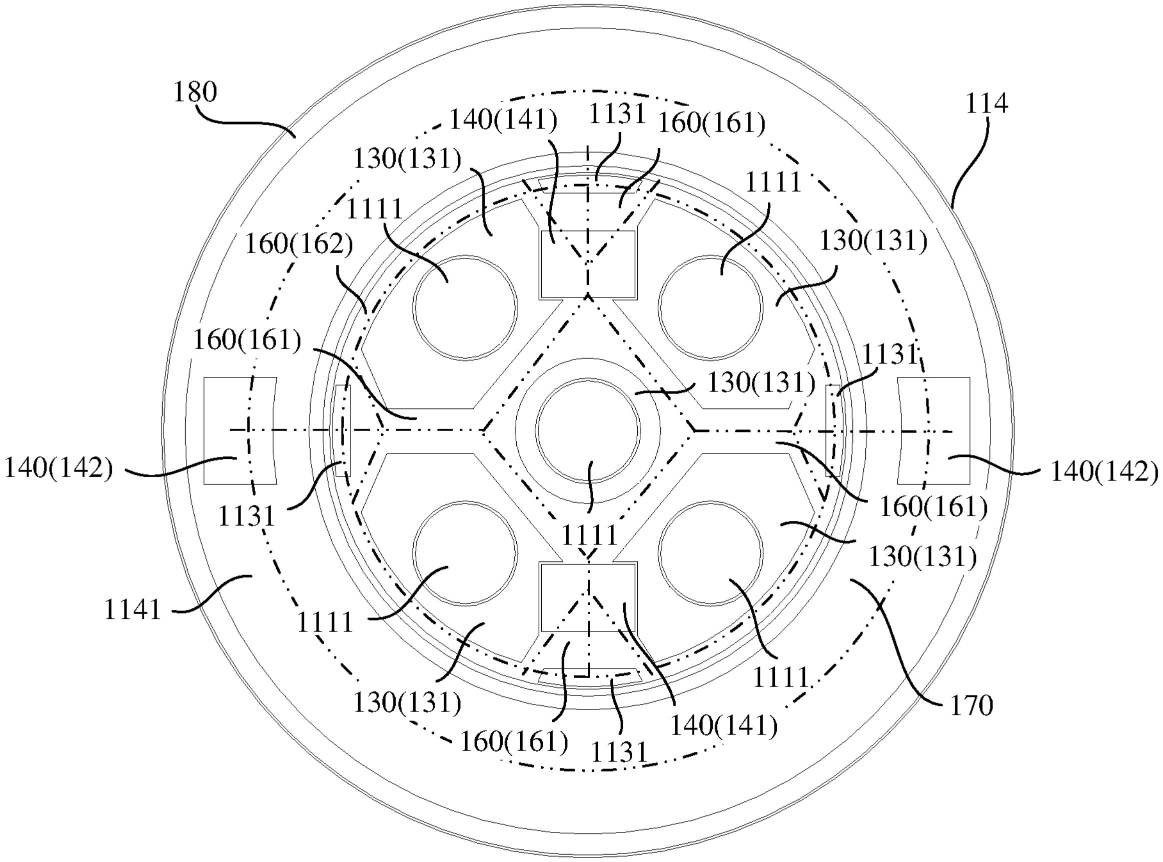
FIG. 19 is a front view of a third decorative member with a cover plate being removed according to an embodiment of this application.

FIG. 19 is a front view of a third decorative member with a cover plate being removed according to an embodiment of this application. Referring to FIG. 19, as another implementation, when a sufficient bonding area is provided on an inner wall surface of the housing 200, the width of the lapping rim 114 of the support 110 may also be widened as a whole. That is to say, the widened portion 1141 may be arranged as an annular portion, and at least two second balance holes 142 are provided at intervals in the annular widened portion 1141 in the circumferential direction (two second balance holes 142 are used as an example in the figure). The dot and dash line in the figure shows the vent path. The annular widened portion 1141 forms an annular air guide channel 170, and the air guide channel 170 is in communication with the vent channel 160. After passing through the second balance valve 152, the gas in the electronic device 1 may be vented from the second vent gap b through the air guide channel 170, or may be vented to outside through the first vent gap a via any vent channel 160.

In addition, whether a plurality of widened portions 1141 are arranged at intervals in the circumferential direction of the lapping rim 114 or the lapping rim 114 is widened as a whole to form an annular widened portion 1141, in the plurality of second balance holes 142 provided on the widened portion 1141, all the second balance holes 142 may correspond to the corresponding air guide grooves 1131 on the side wall 113 of the support 110. Alternatively, all the second balance holes 142 may be staggered with respect to the air guide groove 1131, or some of the second balance holes 142 may correspond to the corresponding air guide groove 1131, and some of the second balance holes 142 may be staggered with respect to the air guide groove 1131, which is not specifically limited in this embodiment.

It may be understood that, similar to the first balance valve 151 covering the first balance hole 141, the second balance valve 152 covering the second balance hole 142 may be arranged on a side surface of the widened portion 1141 facing the inside of the electronic device 1 (facing the support plate 302 of the middle frame 30), or the second balance valve 152 may also be arranged on a side surface of the widened portion 1141 facing the outside of the electronic device 1 (facing the housing 200). In addition, the second balance valve 152 may also be a waterproof breathable film or a dust filter.

In addition, similar to Embodiment 1, the second balance hole 142 on the widened portion 1141 may also be arranged as a main balance hole for a case that an easy-to-press region on the housing 200 corresponds to a region of the widened portion 1141 of the lapping rim 114 of the support 110, and the second balance holes 142 may include one or at least two main balance holes for a case that a plurality of second balance holes 142 are provided. An area of the main balance hole may be greater than an area of another balance hole 140, and the details are not described herein again.

Embodiment 3

Based on Embodiment 1 and Embodiment 2, this embodiment changes the vent structure of the decorative member 100, which is to be described in detail below.

Figure 20:
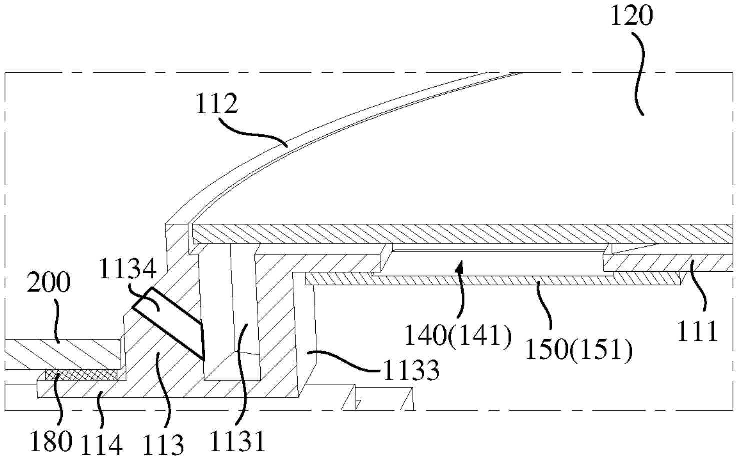
FIG. 20 is a partial sectional view of a fourth decorative member according to an embodiment of this application.

FIG. 20 is a partial sectional view of a fourth decorative member according to an embodiment of this application. Referring to FIG. 20, based on the air guide groove 1131 provided on the side wall 113 of the support 110 of the decorative member 100, the communication groove 1132 extending from the outer wall surface to the inner wall surface is provided on the side wall 113, and the communication groove 1132 is arranged to correspond to the second vent gap b and to be in communication with the air guide groove 1131, so as to vent air to outside through the second vent gap b. As an alternative, in this embodiment, a first vent hole 1134 may be provided on the side wall 113 of the support 110, and air is vented to outside the first vent hole 1134.

The first vent hole 1134 extends from the outer wall surface of the side wall 113 to the inner wall surface to be in communication with the air guide groove 1131, and the first vent hole 1134 is exposed outside the housing 200 of the electronic device 1. In this way, the gas in the electronic device 1 flows to the air guide groove 1131 via the vent channel 160, enters the first vent hole 1134 through the air guide groove 1131, and can directly flow to the outside through the first vent hole 1134 without being vented through the second vent gap b.

Figure 21:
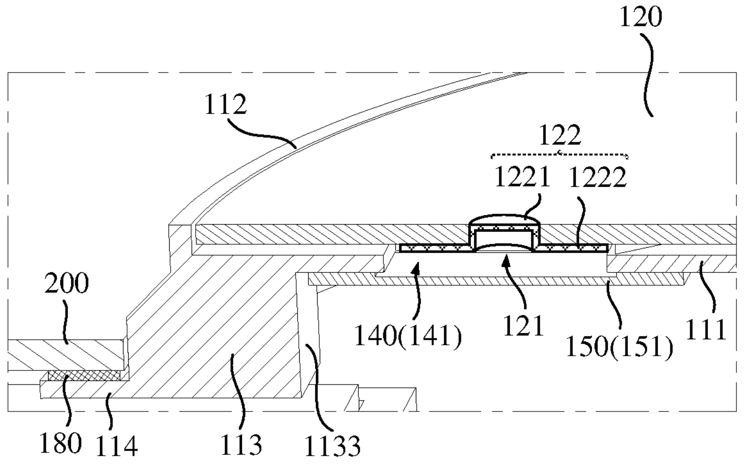
FIG. 21 is a partial sectional view of a fifth decorative member according to an embodiment of this application.

FIG. 21 is a partial sectional view of a fifth decorative member according to an embodiment of this application. Referring to FIG. 21, in another implementation, a second vent hole 121 may also be provided on the cover plate 120, and the second vent hole 121 is arranged to avoid the first adhesive layer 130, so that the second vent hole 121 is located within the coverage of the vent channel 160 formed between the main board portion 111 of the support 110 and the cover plate 120. In this way, the second vent hole 121 is in communication with the vent channel 160, and the gas in the electronic device 1 flows along the vent channel 160 after passing through the first balance valve 151 and is discharged from the second vent hole 121.

The second vent hole 121 is covered with a decorative mesh 122. The decorative mesh 122 has a porous structure. On the one hand, the decorative mesh 122 plays the role of ventilation and prevents foreign matters such as dust and water droplets from entering the electronic device 1. On the other hand, through selection and design of the material and shape of the decorative mesh 122, the decorative mesh may further have an aesthetic effect.

According to the actual requirement, one or at least two second vent holes 121 may be provided on the cover plate 120. It should be noted that while the second vent hole 121 is provided on the cover plate 120, an air guide groove 1131 may also be provided on the side wall 113 of the support 110, and a communication groove 1132 or a first vent hole 1134 in communication with the air guide groove 1131 may be provided, to simultaneously vent air to outside through the second vent gap b or the first vent hole 1134.

In addition, a projection of the second vent hole 121 on the cover plate 120 on the main board portion 111 may be located in the coverage region of the first balance hole 141. In this way, the second vent hole 121 exactly faces the first balance valve 151, and the vent path between the second vent hole and the first balance valve is short, so that the gas in the electronic device 1 may be directly vented to outside through the decorative mesh 122 covering the second vent hole 121 after passing through the first balance valve 151, and the venting efficiency is high.

Still referring to FIG. 21, the decorative mesh 122 covering the second vent hole 121 may include an embedded portion 1221 and an outer ring portion 1222. The outer ring portion 1222 is arranged around the outer circumference of the embedded portion 1221, and the decorative mesh 122 may be an integrated structural member. The embedded portion 1221 protrudes toward a side of the outer ring portion 1222 facing the cover plate 120, and the outer ring portion 1222 is attached to the inner surface of the cover plate 120 to connect and fix the decorative mesh 122 to the cover plate 120, so that the embedded portion 1221 is embedded into the second vent hole 121 to cover the second vent hole 121. In this way, the decorative mesh 122 is connected to the inner surface of the cover plate 120, so as to ensure that the decorative mesh 122 is firmly connected without affecting the flatness of the outer surface of the cover plate 120, and the embedded portion 1221 is exposed in the second vent hole 121, which can have a decorative effect.

Exemplarily, a top end surface of the embedded portion 1221, that is, a side surface of the embedded portion 1221 facing away from the outer ring portion 1222, may be flush with the outer surface of the cover plate 120. In this way, the embedded portion 1221 may be obviously exposed in the second vent hole 121, which has a good decorative effect. Moreover, the embedded portion 1221 does not affect the flatness of the outer surface of the cover plate 120, and the top end surface of the embedded portion 1221 is flush with the outer surface of the cover plate 120, so that foreign matters such as dust and dirt can be prevented from accumulating on the decorative mesh 122.

In the descriptions of embodiments of this application, it should be noted that, unless otherwise explicitly specified and defined, the terms "mount", "connected", and "connection" should be understood in a broad sense. For example, the connection may be a fixed connection, an indirect connection through an intermediary, internal communication inside two elements, or an interaction relationship between two elements. A person of ordinary skill in the art can understand specific meanings of the foregoing terms in embodiments of this application according to a specific situation.

The terms such as "first", "second", "third", and "fourth" (if any) in the specification and claims of embodiments of this application and in the accompanying drawings are used for distinguishing between similar objects and not necessarily used for describing any particular order or sequence.

What is claimed is:

1. A decorative member, configured to be mounted to a housing of an electronic device, the decorative member comprising a support, a cover plate, a first adhesive layer, and a balance valve, and wherein:

the support comprises a main board portion, a decorative ring, and a connecting portion, two side surfaces of the main board portion are respectively a first surface and a second surface, the first surface faces outside of the housing, the second surface faces inside of the housing, the decorative ring protrudes from the first surface, the cover plate is arranged on the first surface, a first vent gap is arranged between the cover plate and the decorative ring, the connecting portion is connected to a periphery of the second surface and is configured to be connected to the housing, at least one accommodating hole extends in the main board portion, and the first adhesive layer is bonded between the cover plate and the main board portion and is arranged around an outer circumference of the at least one accommodating hole, the connecting portion comprises a side wall and a lapping rim, the side wall is connected to the periphery of the second surface and extends toward the housing, the lapping rim is connected to an end of the side wall facing away from the main board portion, and the lapping rim is configured to be connected to the housing, the lapping rim is configured to be attached to a side surface of the housing facing inside of the electronic device, and the side wall is configured to extend out of the electronic device through a mounting hole provided on the housing; and a balance hole extends in the support, the balance hole comprises at least two first balance holes extending in the main board portion, the balance valve comprises first balance valves covering the at least two first balance holes in a one-to-one correspondence, at least two vent channels in communication with each other are formed between the main board portion and the cover plate, the first adhesive layer is configured to avoid the at least two vent channels, each of the at least two vent channels is in communication with the first vent gap, and the at least two first balance holes are in communication with the at least two vent channels.

2. The decorative member according to claim 1, wherein the main board portion comprises a first region and a second region respectively located on two sides of a center line of the main board portion, and the at least two first balance holes extend in both the first region and the second region.

3. The decorative member according to claim 1, wherein the first adhesive layer comprises at least two adhesive sheets isolated from each other, and outer edges of the at least two adhesive sheets extend to an edge of the main board portion; and the at least two vent channels comprise at least two first vent channels, each of at least two first vent channels extend from a middle of the main board portion to the edge of the main board portion, and the at least two first balance holes are located in a middle region of the at least two first vent channels.

4. The decorative member according to claim 3, wherein the decorative ring comprises at least one stepped groove, and the at least one stepped groove is arranged corresponding to ends of the at least two first vent channels; and the at least one stepped groove extends from an inner wall surface to an outer wall surface of the decorative ring, and the at least one stepped groove is in communication with a top end surface of the decorative ring.

5. The decorative member according to claim 1, wherein the first adhesive layer comprises one adhesive sheet, an edge of the one adhesive sheet comprises a notch section, the notch section is located between adjacent first balance holes of the at least two first balance holes, and a spacing is defined between the notch section and an edge of the main board portion; and the at least two vent channels comprise at least two second vent channels, each of at least two second vent channels are formed between the notch section and the decorative ring, and the at least two second vent channels extend along a periphery of the main board portion and are in communication with the adjacent first balance holes.

6. The decorative member according to claim 1, wherein the first adhesive layer comprises at least two adhesive sheets isolated from each other, an edge of the at least two adhesive sheets that face an edge of the main board portion comprises a notch section, the notch section is located between adjacent first balance holes of the at least two first balance holes, and a spacing is defined between the notch section and the edge of the main board portion; and the at least two vent channels comprise at least one first vent channel and at least one second vent channel, the at least one first vent channel extends from a middle of the main board portion to an edge of the main board portion, and the at least one second vent channel extends along a periphery of the main board portion and is in communication with the adjacent first balance holes.

7. The decorative member according to claim 1, wherein the side wall is provided with at least one air guide groove, a notch of the at least one air guide groove is located on the first surface and is in communication with the at least two vent channels, the at least one air guide groove extends toward a side where the lapping rim is located, and the at least one air guide groove is in communication with the outside.

8. The decorative member according to claim 7, wherein the side wall is further provided with a first vent hole, and the first vent hole is exposed outside the housing and extends from an outer wall surface of the side wall to be in communication with the at least one air guide groove.

9. The decorative member according to claim 7, wherein the side wall comprises an inner extension, the inner extension protrudes from an inner wall surface of the side wall toward a center of the support, and the at least one air guide groove is provided on the inner extension.

10. The decorative member according to claim 7, wherein a second vent gap is between the side wall and a hole wall of the mounting hole, and the at least one air guide groove is in communication with the second vent gap.

11. The decorative member according to claim 10, wherein a communication groove extends in the side wall, the communication groove is arranged corresponding to the hole wall of the mounting hole, and two ends of the communication groove are respectively in communication with the at least one air guide groove and the second vent gap.

12. The decorative member according to claim 11, wherein a groove top wall of the communication groove closest to the first surface is higher than a plane where an outer surface of the housing is located.

13. The decorative member according to claim 10, wherein the lapping rim comprises at least one widened portion, the at least one widened portion extends toward outside of the support, at least one air guide channel is formed between the at least one widened portion and an inner surface of the housing, and the at least one air guide channel extends to the side wall and is in communication with the at least two vent channels; and the balance hole further comprises at least one second balance hole provided on the at least one widened portion, the at least one second balance hole is located in the at least one air guide channel, and the balance valve further comprises a second balance valve covering the at least one second balance hole.

14. The decorative member according to claim 13, wherein at least two widened portions are arranged, the at least two widened portions are arranged at intervals in a circumferential direction of the lapping rim, and at least one second balance hole extends in each of the at least two widened portions.

15. The decorative member according to claim 13, wherein the at least one widened portion is an annular portion, and the at least one widened portion comprises at least two second balance holes arranged at intervals in a circumferential direction.

16. The decorative member according to claim 13, wherein the at least one second balance hole is arranged corresponding to the at least one air guide groove in a circumferential direction of the support.

17. The decorative member according to claim 13, wherein the at least one second balance hole is staggered from the at least one air guide groove in a circumferential direction of the support.

18. A housing assembly, mounted to an electronic device, comprising a housing and a decorative member configured to be mounted to the housing of the electronic device, the decorative member comprising a support, a cover plate, a first adhesive layer, and a balance valve, and wherein:

the support comprises a main board portion, a decorative ring, and a connecting portion, two side surfaces of the main board portion are respectively a first surface and a second surface, the first surface faces outside of the housing, the second surface faces inside of the housing, the decorative ring protrudes from the first surface, the cover plate is arranged on the first surface, a first vent gap is arranged between the cover plate and the decorative ring, the connecting portion is connected to a periphery of the second surface and is configured to be connected to the housing, at least one accommodating hole extends in the main board portion, and the first adhesive layer is bonded between the cover plate and the main board portion and is arranged around an outer circumference of the at least one accommodating hole, the connecting portion comprises a side wall and a lapping rim, the side wall is connected to the periphery of the second surface and extends toward the housing, the lapping rim is connected to an end of the side wall facing away from the main board portion, and the lapping rim is configured to be connected to the housing, the lapping rim is configured to be attached to a side surface of the housing facing inside of the electronic device, and the side wall is configured to extend out of the electronic device through a mounting hole provided on the housing; and a balance hole extends in the support, the balance hole comprises at least two first balance holes extending in the main board portion, the balance valve comprises first balance valves covering the at least two first balance holes in a one-to-one correspondence, at least two vent channels in communication with each other are formed between the main board portion and the cover plate, the first adhesive layer is configured to avoid the at least two vent channels, each of the at least two vent channels is in communication with the first vent gap, and the at least two first balance holes are in communication with the at least two vent channels; and the decorative member covers the mounting hole.

19. An electronic device, comprising a screen, a middle frame, an audio device, and a housing assembly, wherein the middle frame comprises a frame body and a support plate, the frame body is arranged on a peripheral side of the support plate, and the screen and the housing assembly are respectively connected to two sides of the middle frame;

an accommodating space is defined between the support plate and a housing of the housing assembly, and the audio device is mounted in the accommodating space; and the support plate is provided with a sound outlet, and a sound outlet surface of the audio device is exposed in the sound outlet;

wherein the housing assembly is mounted to the electronic device and comprises the housing and a decorative member, configured to be mounted to the housing of the electronic device, the decorative member comprising a support, a cover plate, a first adhesive layer, and a balance valve, and wherein:

the support comprises a main board portion, a decorative ring, and a connecting portion, two side surfaces of the main board portion are respectively a first surface and a second surface, the first surface faces outside of the housing, the second surface faces inside of the housing, the decorative ring protrudes from the first surface, the cover plate is arranged on the first surface, a first vent gap is arranged between the cover plate and the decorative ring, the connecting portion is connected to a periphery of the second surface and is configured to be connected to the housing, at least one accommodating hole extends in the main board portion, and the first adhesive layer is bonded between the cover plate and the main board portion and is arranged around an outer circumference of the at least one accommodating hole, the connecting portion comprises a side wall and a lapping rim, the side wall is connected to the periphery of the second surface and extends toward the housing, the lapping rim is connected to an end of the side wall facing away from the main board portion, and the lapping rim is configured to be connected to the housing, the lapping rim is configured to be attached to a side surface of the housing facing inside of the electronic device, and the side wall is configured to extend out of the electronic device through a mounting hole provided on the housing; and a balance hole extends in the support, the balance hole comprises at least two first balance holes extending in the main board portion, the balance valve comprises first balance valves covering the at least two first balance holes in a one-to-one correspondence, at least two vent channels in communication with each other are formed between the main board portion and the cover plate, the first adhesive layer is configured to avoid the at least two vent channels, each of the at least two vent channels is in communication with the first vent gap, and the at least two first balance holes are in communication with the at least two vent channels; and the decorative member covers the mounting hole.

20. The electronic device according to claim 19, wherein the main board portion comprises a first region and a second region respectively located on two sides of a center line of the main board portion, and the at least two first balance holes extend in both the first region and the second region.

* * * * *